(12) United States Patent
Kuroda

(10) Patent No.: US 9,122,182 B2
(45) Date of Patent: Sep. 1, 2015

(54) CHARGE CONTROL AGENT AND TONER FOR ELECTROSTATIC IMAGE DEVELOPMENT CONTAINING SAME

(75) Inventor: Kazuyoshi Kuroda, Neyagawa (JP)

(73) Assignee: ORIENT CHEMICAL INDUSTRIES CO., LTD., Osaka-shi (JP)

(*) Notice: Subject to any disclaimer, the term of this patent is extended or adjusted under 35 U.S.C. 154(b) by 80 days.

(21) Appl. No.: 14/001,629

(22) PCT Filed: Feb. 27, 2012

(86) PCT No.: PCT/JP2012/054812
§ 371 (c)(1),
(2), (4) Date: Oct. 18, 2013

(87) PCT Pub. No.: WO2012/118025
PCT Pub. Date: Sep. 7, 2012

(65) Prior Publication Data
US 2014/0038096 A1  Feb. 6, 2014

(30) Foreign Application Priority Data
Feb. 28, 2011 (JP) ................... 2011-042963

(51) Int. Cl.
G03G 9/08 (2006.01)
G03G 9/097 (2006.01)

(52) U.S. Cl.
CPC ........ G03G 9/09733 (2013.01); G03G 9/09775 (2013.01)

(58) Field of Classification Search
CPC ................................. G03G 9/09733
USPC ........................................ 430/108.1
See application file for complete search history.

(56) References Cited

U.S. PATENT DOCUMENTS

| | | | |
|---|---|---|---|
| 5,501,934 A | 3/1996 | Sukata et al. | |
| 5,736,289 A | 4/1998 | Sukata et al. | |
| 5,972,554 A | 10/1999 | Nagatsuka et al. | |
| 2003/0104298 A1 | 6/2003 | Yamanaka et al. | |
| 2006/0154165 A1* | 7/2006 | Yasumatsu et al. | 430/108.23 |

FOREIGN PATENT DOCUMENTS

| | | |
|---|---|---|
| JP | 2 201378 | 8/1990 |
| JP | 3 237467 | 10/1991 |
| JP | 4 139456 | 5/1992 |
| JP | 7-62249 A | 3/1995 |
| JP | 9-281749 A | 10/1997 |
| JP | 10 153884 | 6/1998 |
| JP | 11 15205 | 1/1999 |
| JP | 11 30880 | 2/1999 |
| JP | 2000 162825 | 6/2000 |

OTHER PUBLICATIONS

International Search Report Issued May 15, 2012 in PCT/JP12/54812 Filed Feb. 27, 2012.

* cited by examiner

Primary Examiner — Mark A Chapman
(74) Attorney, Agent, or Firm — Oblon, McClelland, Maier & Neustadt, L.L.P.

(57) ABSTRACT

Provided is a charge control agent comprising a phenol multimeric mixture of a plurality of phenol multimers of the formula (1). A is a 4-chlorophenol ring-containing group of the formula (2) or the formula (3), $R^1$-$R^4$ are hydrogen atoms or alkyl groups, m is an integer of 0-2, and x is an integer of 16-28, when A is represented by the formula (2), and a number in the range indicated by (14−2m)/(m+2) to (26−2m)/(m+2), when A is represented by the formula (3):
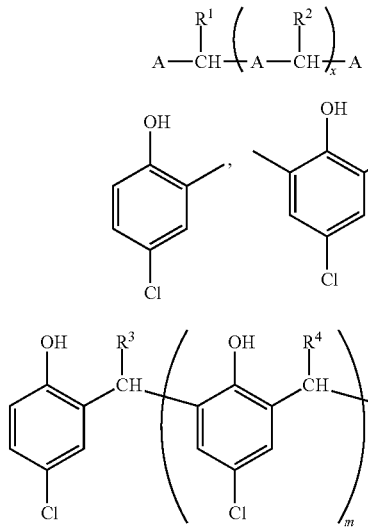
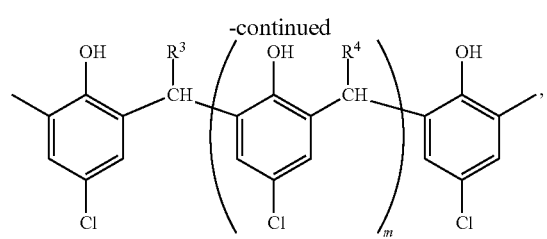
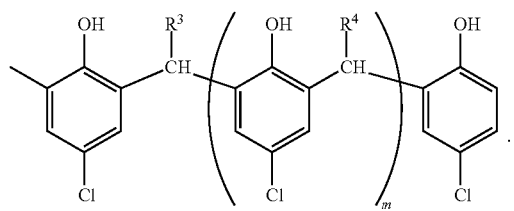
12 Claims, 8 Drawing Sheets

CHARGE CONTROL AGENT AND TONER FOR ELECTROSTATIC IMAGE DEVELOPMENT CONTAINING SAME

TECHNICAL FIELD

The present invention relates to an electrostatic charge image developing toner for developing electrostatic latent images in fields such as electrophotography, electrostatic records, electrostatic printing, etc., to a charge control agent for controlling the charge amount of the toner, and to a method for controlling the charge of resin powder.

BACKGROUND ART

In duplicators (or copiers), printers, etc. which utilize an electrophotographic technique, various toners comprising coloring agents and fixing resin have been used to develop electrostatic latent images formed on a photoreceptor having a photosensitive layer containing an inorganic or organic photoconductive material.

Chargeability of such toner is an important factor in a system for developing the electrostatic latent images. Accordingly, in order to appropriately control or stabilize the charge amount of the toner, a charge control agent having a positive or negative charge-granting property has often added to the toner.

As a conventional charge control agent that has been practically used and grants a negative charge to the toner, metal complex salt dyes of monoazo compounds, metal salts or metal complexes of aromatic hydroxycarboxylic acids such as alkyl salicylic acid, etc., can be exemplified. Among them, many of the metal complexes having a structure of azo dyes which have been used as charge control agents have generally a poor stability. For example, they could be decomposed or deteriorated so that their charge control characteristics could be easily impaired due to mechanical friction or shock, electrical impact, exposure to light, or changes in temperature or humidity conditions. In addition, even if charge control agents have a practical level in terms of charge granting property, many of those agents cannot be used as the charge control agents for color toner because they have unsatisfying charge stability or they have a color.

The conventional charge control agents which are colorless or have a white color or light color can be applicable to color toner in terms of color, but almost all agents has problems in terms of performance. They have such disadvantages that high light uniformity has not yet achieved and there is a change in density of images in the durability test. Further, some charge control agents have such drawbacks as difficulty in taking a balance between image densities and fogging, difficulty in obtaining a sufficient image density in a high humidity environment, poor dispersibility to the resin, adverse effects on the storage stability and fixability, etc.

As a charge control agent that applies (grants) a negative charge and can contribute to further improve the performance of copiers, printers, etc., in which color toner is used, for example, calix n arene (a cyclic condensates obtained from an aldehyde and phenol) (Patent Document 1), metal complexes of resorcinol n arene or calix n arene (Patent Document 2), specific dimeric condensates obtained from an aldehyde and a phenol (Patent Document 3), phenol derivative compounds which contain no heavy metals (Patent Document 4), etc. have been known so far.

These cyclic condensation products have high melting points, are strong due to its cyclic structure and have very low solubility in organic solvents. Therefore, when they are added into the toner as the charge control agents, a high charge amount can be achieved, but it is difficult to disperse them in the toner. In particular, in the case of using a low viscosity resin for the color toner, dispersion becomes difficult, and toner scattering is liable to become deteriorated. Further, more efficient electron transfer is essential for improving the charge amount.

To improve the electron transferring, it is advantageous to increase an electronic bias by substituting the para position of the phenyl group, which is an opposite position with respect to the phenolic hydroxyl group (an electron-donating group), with an electron-withdrawing group. However, in cyclic compounds, it is not easy to synthesize electron-withdrawing group-substituted compounds. Accordingly, compounds which are other than the cyclic compounds such as calix n arene, resorcinol n arene, etc., and which have a favorable charging characteristics equivalent to the same effects as that of the cyclic compounds, have been desired.

In order to solve these problems, modification of chain compounds has been considered to be more practical.

PRIOR ART DOCUMENTS

Patent Documents

[Patent document 1] Japanese Patent Application Publication H2-201378 A1

[Patent document 2] Japanese Patent Application Publication 2000-162825 A1

[Patent document 3] Japanese Patent Application Publication H11-30880 A1

[Patent document 4] Japanese Patent Application Publication H10-153884 A1

SUMMARY OF THE INVENTION

Problems to be Solved by the Invention

Objects of the present invention are to solve the aforementioned problems and to provide charge control agents that give toner a practical level of negative chargeability, are colorless or a light color and can be used in color toner, and have an electrostatic charge originated from charging of a resin powder such as the toner used, which is stable against environmental changes and has the characteristics of: excellent temporal stability of charge control characteristics, i.e., storage stability; excellent stability of charge control characteristics when repeatedly used a number of times when used in the toner, i.e. durability; and high stability with containing no toxic heavy metals, i.e. high safety; and to provide electrostatic charge image developing toner containing the charge control agent.

Means to Solve the Problems

Inventors of the present invention conducted intensive studies and found that when a charge control agent comprising a phenol multimer represented by the following chemical formula (1) is used as a toner, the toner exhibits excellent charging characteristics. Further, the inventors found that when the phenol multimer has a certain high molecular weight average degree of polymerization, it shows a good compatibility to the resin to be used in the toner, and further the safety is also enhanced, thus completing the present invention.

The charge control agent of the present invention, which is made in order to attain the above-mentioned object, comprises a phenol multimeric mixture containing several types of phenol multimer that is represented by the following chemical formula (1)

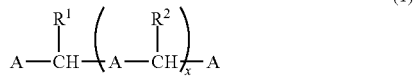
(1)

in the formula (1), $R^1$ and $R^2$ are each independently a hydrogen atom or an alkyl group having a carbon number of 1-3; A is a monovalent group when placed at end of the main chain or a divalent group when placed within the main chain, and is a 4-chlorophenol ring-containing group represented by the following chemical formula (2)

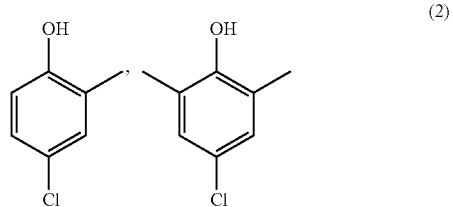
(2)

or the following chemical formula (3)

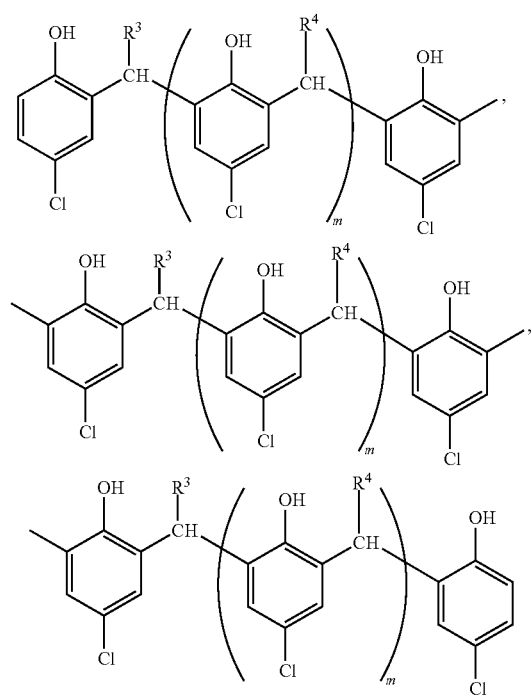
(3)

in the chemical formula (3), $R^3$ and $R^4$ are each independently a hydrogen atom or an alkyl group having a carbon number of 1-3, and m is an integer of 0-2; and x is an integer of 16-28 when A is the chemical formula (2) or is a number within a range represented by $(14-2m)/(m+2)$ to $(26-2m)/(m+2)$ when A is the chemical formula (3).

Concerning signals based on a phenolic hydroxyl group of the phenol multimer in a nuclear magnetic resonance spectrum of the phenol multimeric mixture, an integral ratio between a signal that appears on a low magnetic field side and a signal that appears on a high magnetic field side is preferably in the range of 2:16-2:28.

In a nuclear magnetic resonance spectrum, the phenol multimeric mixture of the charge control agent may exhibit at least two signals between 4 and 6 ppm.

In the X-ray diffraction spectrum of the phenol multimeric mixture of the charge control agent, a peak appears at the Bragg angle $(2\theta \pm 0.2°)$ of at least 20.4°. Peaks may further appear at the Bragg angle $(2\theta \pm 0.2°)$ of at least 9.9°, 18.2°, 20.4°, and 24.1°.

In the charge control agent, at least some hydrogen atoms of the phenolic hydroxyl groups of the phenol multimer are substituted with alkali metals, and a content of alkali metal in the phenol multimer may be in the range of 0.1-3.0% by weight.

The phenol multimer of the charge control agent is preferably a condensation product produced from the 4-chlorophenol derivative and a formaldehyde derivative.

The formaldehyde derivative in the charge control agent is preferably formaldehyde, paraformaldehyde, and trioxane.

As for the charge control agent, a preferable equivalent ratio of the formaldehyde derivative to the 4-chlorophenol derivative is in the range of 0.75-1.05.

As for the charge control agent, the 4-chlorophenol derivative is preferably at least any one of a dimer to a tetramer of 4-chlorophenol which are represented by the following chemical formula (4),

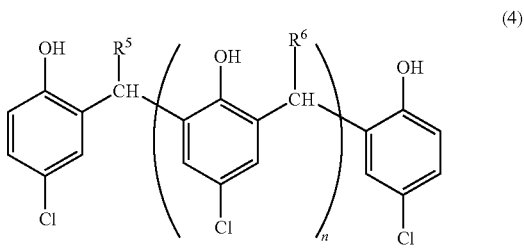
(4)

in the chemical formula (4), $R^5$ and $R^6$ are each independently a hydrogen atom or an alkyl group having a carbon number of 1-3, n is an integer of 0-2.

The electrostatic charge image developing toner of the present invention comprises the charge control agent, a resin for the toner, and colorant.

In addition, the electrostatic charge image developing toner of the present invention is a polymer polymerized using at least the charge control agent described above, a polymerizable monomer, a polymerization initiator, and colorant.

The method for controlling the charge of the present invention comprises steps of:
a step of letting the resin powder contain the charge control agent; and then a step of performing the charge control of the resin powder by charging the resin powder.

Advantageous Effects of the Present Invention

The charge control agent of the present invention is excellent in: a negative charge granting property; a stability of this negative charge granting property; and dispersibility in a resin for the toner; safety because no toxic heavy metals are contained. Further, the charge control agent is colorless or a light color, accordingly can be used for the toner of electrostatic charge image development, especially for the color toner.

When the charge control agent is used for the toner, an excellent environmental stability, storage stability and durability of the charge amount can be realized.

Since the charge control agent is light color, there is little tendency to cause a color failure when used in toner. The charge control agent is likely to appear on the surface of the toner particles, accordingly has a good chargeability and is particularly suitable for a polymerized toner.

The electrostatic charge image developing toner of the present invention can realize an excellent fixing property and non-offset property under a wide temperature range as well as excellent environmental durability, storage stability and durability, and can form a stable copied image.

According to the charge control method of the present invention, negative charge control of the resin powder can be stably carried out, and copying by toner and coating by powder can be performed. In the powder coating obtained by using the method of the present invention, the charge controlling agent contains no toxic heavy metals and is a light color, so that the powder coating obtained has high safety and it is difficult to cause color failure.

PREFERRED EMBODIMENT OF THE PRESENT INVENTION

Figure 1:
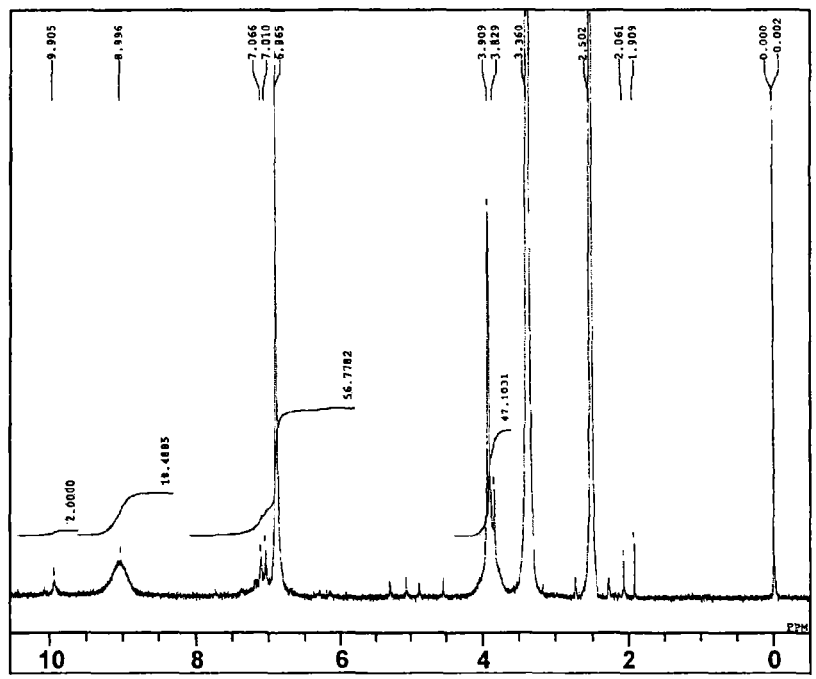
FIG. 1 shows a Nuclear Magnetic Resonance (NMR) chart of the charge control agent of Example 1 of the present invention.

Preferred embodiments of the present invention will be precisely described below, but the scope of the present invention should not be limited to these embodiments.

The charge control agent of the present invention comprises a phenol multimeric mixture containing a several types of phenol multimer represented by the aforementioned chemical formula (1), more specifically a phenol multimer represented by the chemical formula (a) or (b) described below, and having 4-chlorophenol which is repeatedly bonded by methylene group that may be substituted with an alkyl group.

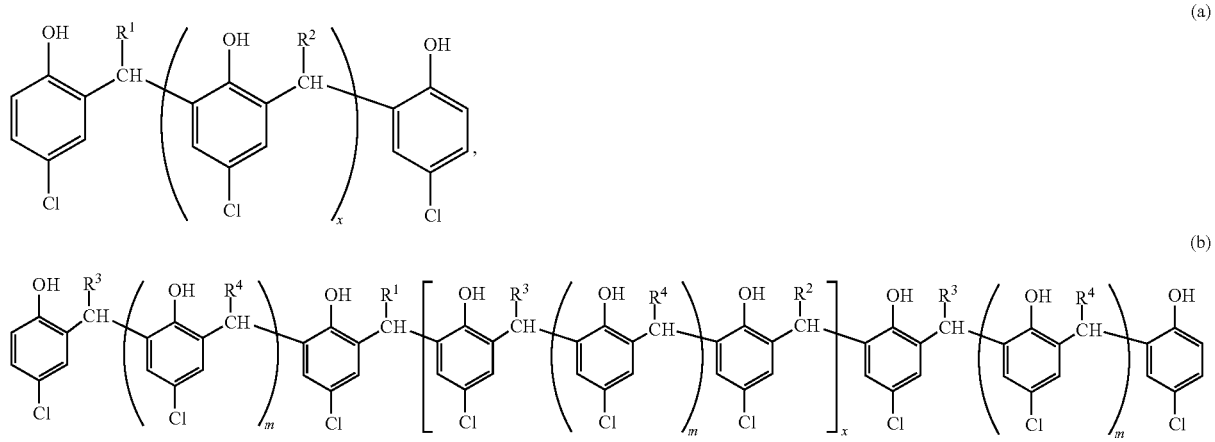

In the chemical formula (a) and (b), $R^1$, $R^2$, $R^3$ and $R^4$ are each independently a hydrogen atom or an alkyl group having a carbon number of 1-3, x is an integer of 16-28 when x is represented by the chemical formula (a), and x is a number in the range represented by $(14-2m)/(m+2)$ to $(26-2m)/(m+2)$ when x is represented by the chemical formula (b). Further, m is an integer of 0-2, respectively. For example, when m=0, x becomes a number of 7-13, and the phenol multimer becomes 18-30-mers. When m=1, x becomes a number of 4-8 and the phenol multimer becomes 18-30-mers. When m=2, x becomes a number of 3-5, the phenol multimer is 20-28-mers. According to these combinations, the phenol multimeric mixture contains several multimers of 18-30-mers of chlorophenol, and an average degree of polymerization of the phenol multimeric mixture is 18-30.

As an alkyl group, methyl group, ethyl group, n-propyl, and iso-propyl can be exemplified.

This phenol multimeric mixture has a peak at the Bragg angle (2θ±0.2°) of at least 20.4° in an X-ray diffraction spectrum, preferably has peaks at 9.9°, 18.2°, 20.4°, and 24.1°, with a sharp peak at 20.4°.

Further, the phenol multimeric mixture can be purified by dissolving the phenol multimeric mixture in an organic solvent, and then subjected to reprecipitation. For example, when the purification is carried out with reprecipitation, the clear sharp peak at the Bragg angle (2θ±0.2°) in X-ray diffraction spectrum is not observed and exhibits an amorphous state.

The phenol multimeric mixture may consist only of a phenol multimer represented by the chemical formula (1) mentioned above. A phenol multimer other than the phenol multimer represented by the chemical formula (1) above, a phenol multimer having less than 18-mers or a phenol multimer having more than 30-mers may be contained in a phenol multimeric mixture, if they do not adversely affect the desired effects.

By comparing an integral ratio of phenolic hydroxyl groups using $^1$H-Nuclear Magnetic Resonance ($^1$H-NMR) spectrum measurement method, an average degree of polymerization of the phenol multimeric mixture can be simply determined. For example, when measured using deuterated dimethyl sulfoxide (DMSO-$d_6$), a signal of the phenolic hydroxyl group of the aromatic ring at both ends of the multimer appears on a lower magnetic field side, and a signal of the phenolic hydroxyl group of the intermediate aromatic ring appears on a higher magnetic field side. Accordingly, the degree of the polymerization can be determined from the ratio of the two signals.

For example, when a trimer of 4-chlorophenol whose structure is clearly known is measured, the ratio between an integral value of a phenolic hydroxyl group appearing at a lower magnetic field (9.8 ppm) and that of a phenolic hydroxyl group appearing at a higher magnetic field (8.8 ppm) is approximately 2:1. Accordingly, the average degree of polymerization can be determined by $^1$H-NMR spectrum. This is because when the phenolic units are bound to some extent, the phenolic hydroxyl groups are considered to bind together intramolecularly to form a structure suitable for electron transfer.

Among the signals of $^1$H-NMR spectrum based on the phenolic hydroxyl group of the phenol multimeric mixture that contains the phenol multimer represented by the chemical formula (1) and another phenol multimer other than the phenol multimer represented by the chemical formula (1), the integral ratio between a signal that appears at the low magnetic field in the vicinity of 10 ppm and another signal that appears at the high magnetic field in the vicinity of 9 ppm is preferably in the range of 2:16-2:28, that is, the signal appearing in the higher magnetic field side is preferably greater than that of the another signal appearing in the lower magnetic field side. Therefore the average degree of polymerization of this phenol multimeric mixture is estimated to be 18-30-mers.

In a case where the integral ratio of the signals detected based on the phenolic hydroxyl groups of the phenol multimeric mixture is less than 2:16, solubility in a solvent becomes excessively high due to its low molecular weight, so that the phenol multimeric mixture cannot maintain its particle state in the toner, causing deterioration in its characteristics. Further, an increase in the amount of the low molecular weight component is likely to increase a possibility to adversely affect the safety in environmental toxicity.

On the other hand, when the integral ratio of the signals based on the phenolic hydroxyl groups of the phenol multimeric mixture is greater than 2:28, the solubility in the solvent becomes too low, dispersion in the resin is deteriorated, and the phenol multimeric mixture is easily peeled off from the surface of the toner.

Furthermore, among the signals based on the phenolic hydroxyl group of the phenol multimeric mixture in $^1$H-NMR spectrum analysis, the integral ratio between a signal appearing on the low magnetic field side and another signal appearing on the high magnetic field side is preferably 2:16-2:28, and two or more signals are preferably observed between 4 and 6 ppm, in particular between 4.5-5.5 ppm. For example, when the phenol multimeric mixture having an integral ratio of 2:18.49 was measured in a deuterated dimethyl sulfoxide, four signals were observed at 4.55 ppm, 4.88 ppm, 5.06 ppm, and 5.29 ppm.

The phenol multimers of the present invention have a high molecular weight, it therefore is difficult to ionize, so that analysis using mass spectrometry cannot be conducted. Accordingly it is unclear which parts are involved in these signals. However, as shown in square brackets of a structural formula below, the phenol multimers may have a stilbene skeleton containing two phenol multimers that are connected by a vinylene group. However, they could be trans-cis isomers when inferred from the structure.

The double bond in the molecule may extend the movement area of electrons, so that transferring of the electron between carriers and the like may be eased. That is, the charge control agent of the present invention contains the phenol multimer having a skeleton as shown in the following structural formula.

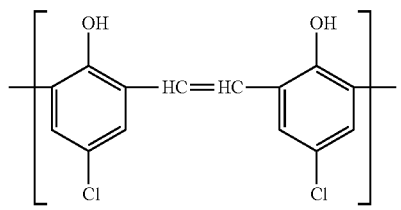

Specific examples of the phenol multimers represented by the chemical formula (1) are depicted in chemical formulas (5)-(11) shown below, but the scope of the present invention should not be limited to these examples.

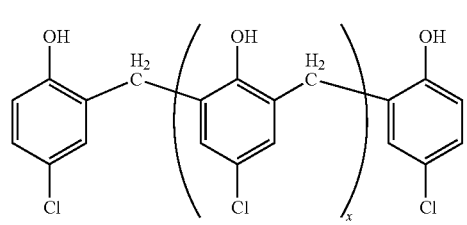

(5)

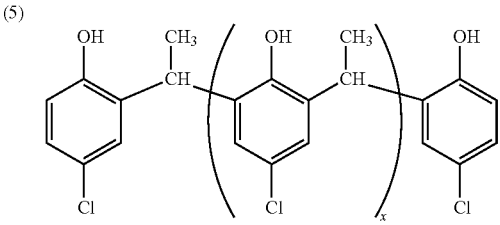

(6)

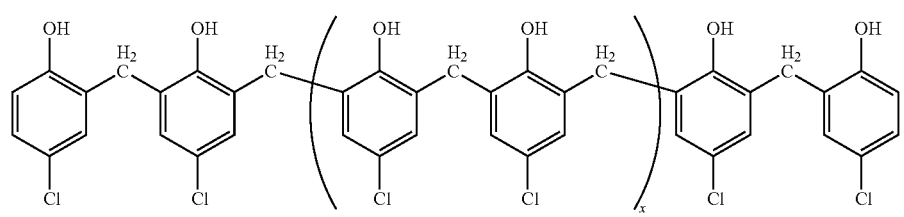

(7)

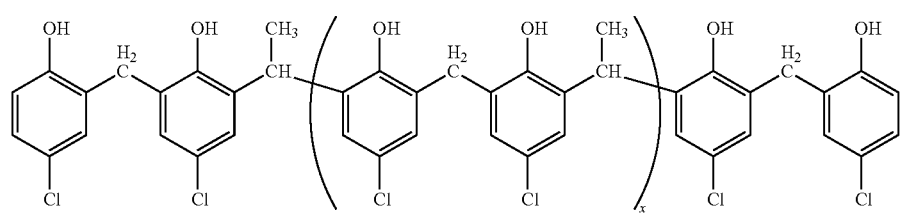

(8)

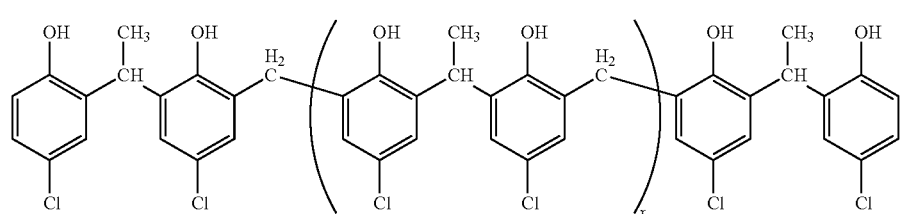

(9)

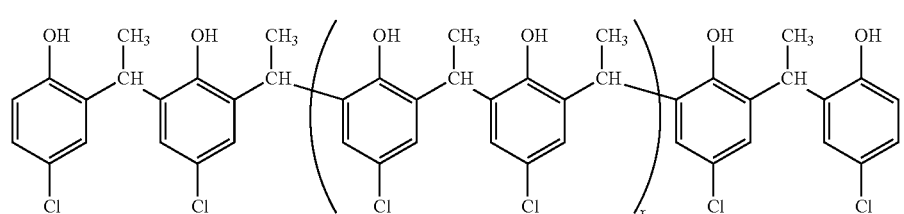

(10)

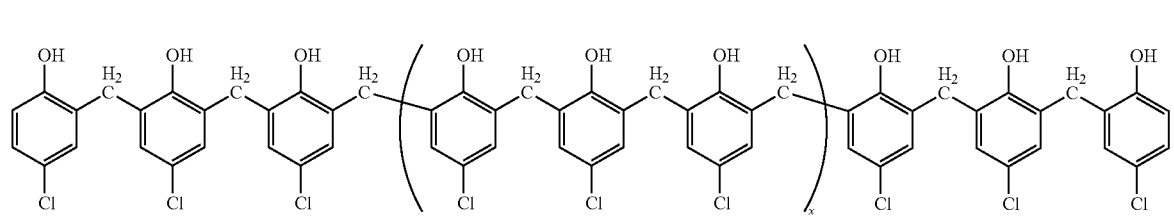

(11)

Such phenol multimeric mixture can be synthesized using publicly known methods. For example, they can be synthesized by condensation reaction of 4-chlorophenol derivatives with formaldehyde derivatives. In general, the phenol multimer that exists in the charge control agent has been often synthesized under an alkaline condition. In this method, the reaction is unlikely to occur if a substituent has not been substituted with an electron-donating group such as an alkyl group or an alkoxy group, and a target compound cannot be obtained in good yields. Therefore, in the synthesis of the phenol multimeric mixture of the present invention, reaction can be preferably carried out under acidic reaction conditions. In other word, under acidic reaction conditions, a high yield can be achieved even if a 4-chlorophenol derivative having a substituted electron-withdrawing group is used.

In this condensation reaction, a reaction ratio of the 4-chlorophenol derivative with the formaldehyde derivative can be appropriately adjusted to the extent that the effect of the present invention is not impaired. A preferred range of an equivalent ratio of the formaldehyde derivative to the 4-chlorophenol derivative or an equivalent ratio converted into terms of formaldehyde molecule is in the range of 0.75-1.05.

In this condensation reaction, an organic solvent and an organic acid publicly known in the art can be used as a reaction solvent. As a preferred organic acid, acetic acid, acetic anhydride, propionic acid and the like can be exemplified. Further, as a preferred organic solvent, dichloromethane, 1,2-dichloroethane, an aliphatic hydrocarbon such as 1,2-dimethoxyethane; a glycol ether such as diethylene glycol dimethyl ether; an aromatic hydrocarbon such as toluene, xylene, chlorobenzene; tetrahydrofuran (THF) and the like, can be exemplified.

In the condensation reaction, a catalyst can be suitably selected according to the reaction system. As a preferred catalyst, acid catalyst and the like can be exemplified. Specifically, as an inorganic acid catalyst, sulfuric acid, hydrochloric acid, hydrobromic acid, and the like, and as an organic acid catalyst, p-toluenesulfonic acid, trifluoroacetic acid, and the like can be exemplified.

Also the reaction conditions such as reaction temperature and reaction time can be adjusted appropriately.

As the 4-chlorophenol derivative used in the synthesis, a dimer to tetramer of 4-chlorophenol [bis(5-chloro-2-hydroxyphenyl)methane, 4-chloro-2,6-bis(5'-chloro-2'-hydroxybenzyl)phenol, etc.] can be exemplified. Preferably, the dimer to tetramer of 4-chlorophenol represented by the following chemical formula (4) are used.

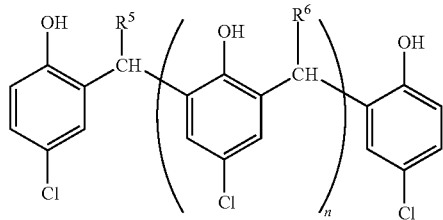

(4)

In the dimer to tetramer of 4-chlorophenol represented by the chemical formula (4), $R^5$ and $R^6$ are independently and respectively a hydrogen atom or a linear or branched alkyl group having a carbon number of 1-3, and n is an integer of 0-2. As this alkyl group, methyl group, ethyl group, n-propyl group, iso-propyl group, and the like can be exemplified.

Specific examples of this dimer to tetramer of 4-chlorophenol are represented by the chemical formula of (12)-(15) below.

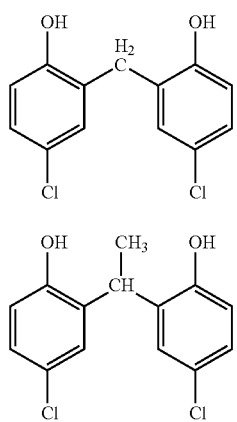

(12)

(13)

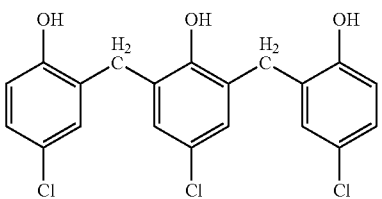

(14)

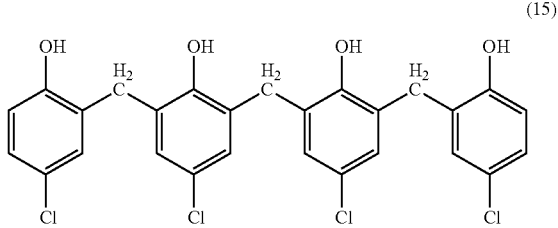

(15)

As the formaldehyde derivative to be used for the synthesis, formaldehyde (HCHO) such as formalin; paraformaldehyde $(HO(CH_2O)_nH)$; trioxane $((CH_2O)_3)$; acetaldehyde; methylolated 4-chlorophenol or 4-chlorophenol methylol (4-chloro-2,6-dihydroxy methyl phenol, 4-chloro-2-hydroxymethyl phenol, bis(5-chloro-3-hydroxymethyl-2-hydroxyphenyl)methane, and the like) can be exemplified. These formaldehyde derivatives may be used alone or in combination of two or more. Preferable formaldehyde derivatives are formaldehyde (HCHO), paraformaldehyde $(HO(CH_2O)_nH)$ and trioxane $((CH_2C)_3)$.

Concrete examples of reaction between the 4-chlorophenol derivative and the formaldehyde derivative are shown in the reaction formulas (I), (II), (III), and (IV) below. The phenol multimeric mixture obtained in this reaction may have a formula described in the reaction formulas of (I), (II), and (IV) below under a condition that p is in the range of 16-28, may only consist of a phenol multimer represented by the chemical formula (1), or may comprise this phenol multimer and another phenol multimer having p of 1-48 as long as desired effects are secured. Further, a phenol multimer may only be represented by the chemical formula (1) above under a condition that q is in the range of 7-13 in the reaction formula (III) below or may comprise this phenol multimer and another phenol multimer having q of 0-23 as long as desired effects are secured. In addition, the reaction between the 4-chlorophenol derivative and the formaldehyde derivative is not limited thereto.

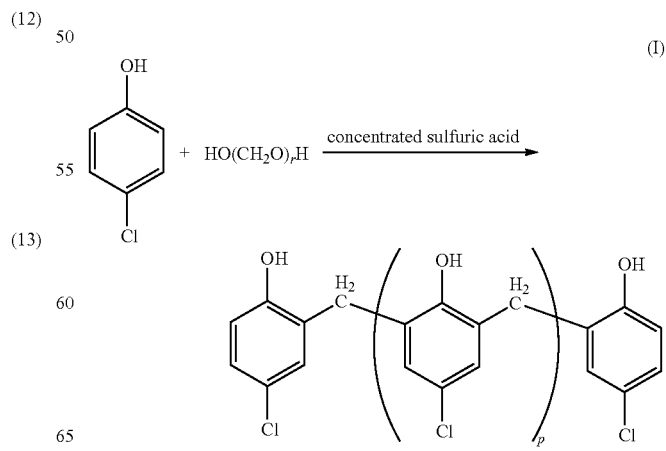

(I)

The first aspect of the preferred embodiment of the reaction between the phenol derivative and the aldehyde derivative is a reaction in the reaction formula (I) described above. The reaction formula (I) above is an embodiment of a reaction between 4-chlorophenol and paraformaldehyde using concentrated sulfuric acid as an acid catalyst. By condensation reaction between 4-chlorophenol, formaldehyde, paraformaldehyde, and/or 1,3,5-trioxane using an acid catalyst such as sulfuric acid in acetic acid solvent, a phenol multimeric mixture is obtained.

In this reaction, the phenol multimeric mixture is obtained in an acetic acid solvent through condensation reaction between a dimer to tetramer of 4-chlorophenol represented by the chemical formula (4) and formaldehyde, paraformaldehyde, and/or 1,3,5-trioxane using an acid catalyst such as sulfuric acid.

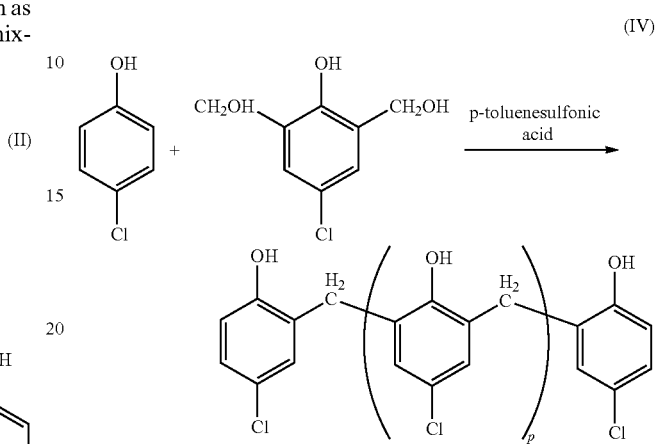

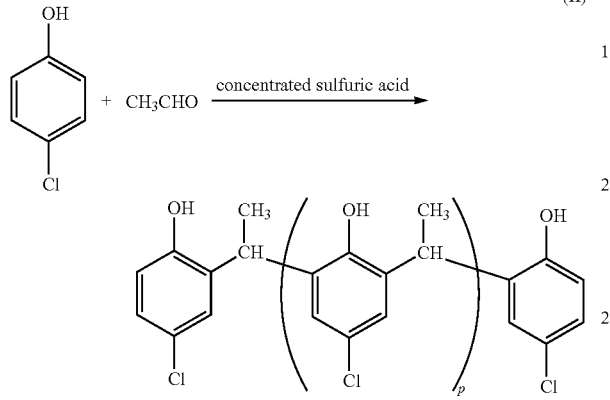

The second aspect of the preferred embodiment of the reaction between the phenol derivative and the aldehyde derivative is a reaction described in the reaction formula (II). The reaction formula (II) is an embodiment of the reaction between 4-chlorophenol and acetaldehyde using concentrated sulfuric acid as an acid catalyst. By condensation reaction between 4-chlorophenol and an aldehyde derivative having a substituent of an alkyl group in a solvent of acetic acid using an acid catalyst such as sulfuric acid, a phenol multimeric mixture is obtained.

The fourth aspect of the preferred embodiment of the reaction is a reaction between the phenol derivative and phenol methylol (a methylolled phenol derivative) represented by the reaction formula (IV). The reaction formula (IV) is a reaction between 4-chlorophenol and 4-chloro-2,6-dihydroxy methyl phenol using p-toluenesulfonic acid as an acid catalyst. 4-chloro-2,6-dihydroxy methyl phenol is obtained by causing a methylolation reaction between 4-chlorophenol and paraformaldehyde, etc. in an alkaline aqueous solution. The phenol multimeric mixture is obtained through condensation reaction between the obtained 4-chloro-2,6-dihydroxy methyl phenol and 4-chlorophenol using an acid catalyst such as p-toluenesulfonic acid in an organic solvent such as THF or 1,2-dichloroethane.

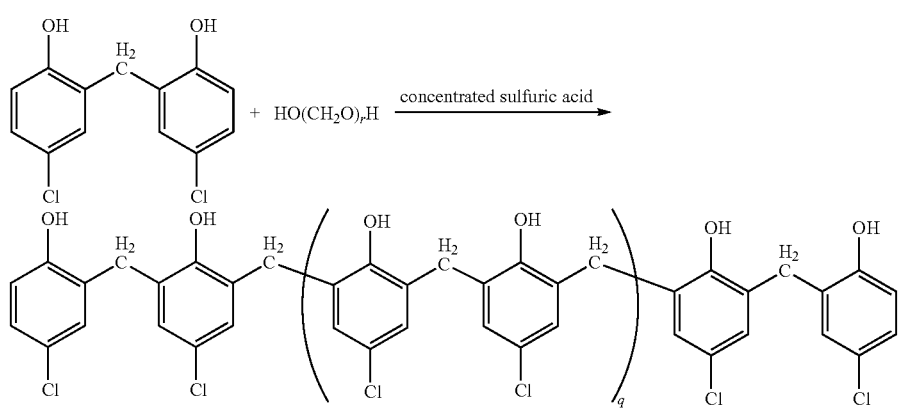

The third aspect of the preferred embodiment of the reaction between the phenol derivative and the aldehyde derivative is a reaction represented by the reaction formula (III). In the reaction formula (III), a chemical reaction between bis(5-chloro-2-hydroxyphenyl)methane and paraformaldehyde is carried out using concentrated sulfuric acid as an acid catalyst.

As a raw material for synthesis of the phenol multimeric mixture, 4-chlorophenol can be used. However, to improve charging characteristics, a compound having two or more chlorophenols which are bound together through a methylene group is preferably used. This is because when 4-chlorophenol is used as a raw material, the obtained compound has a broad molecular weight distribution, but when a compound in which two or more chlorophenols are bound by methylene groups is used as a raw material, reactivity of the raw material is higher than that of 4-chlorophenol, so that the reaction proceeds rapidly and thus the molecular weight distribution tends to become narrower.

For example, in a phenol multimeric mixture of 20-21-mers which was synthesized using 4-chlorophenol, a value of weight average molecular weight/number average molecular weight (Mw/Mn) obtained by gel permeation chromatography analysis was 19.1. On the other hand, in a phenol multimeric mixture of 21-22-mers which was synthesized using bis(5-chloro-2-hydroxyphenyl)methane, a value of weight average molecular weight/number average molecular weight (Mw/Mn) was 5.56 which is smaller than the above result. To illustrate more specifically, a phenol multimeric mixture of 20-21-mers which was synthesized using 4-chlorophenol was obtained in Example 1 described below, and the phenol multimeric mixture of 21-22-mers which was synthesized using bis(5-chloro-2-hydroxyphenyl)methane was obtained in Example 3 described below.

For example, in the gel permeation chromatography analysis, a standard polystyrene resin (EasiCal PS-1, manufactured by Polymer Laboratories Ltd.) was used for calibration of molecular weight, two separation columns (manufactured by Tosoh Corporation, TSKgel Super AWM-H, 6.0 mm I.D.×15 cm) were used as a measuring device, and an RI detector (RI-101, manufactured by Shodex) was used as a detecting device. N, N-dimethylformamide (DMF) into which 10 mM (m mol/l) lithium bromide was added was used as a mobile phase, and measurement was carried out by adjusting a flow rate of the mobile phase to 0.6 mL/minutes. In addition, measuring was carried out by at first sampling approximately 4 mg of the sample, then it was dissolved into 4 mL mobile phase, then 20 μL solution was taken from the 4 mL solution and used as a sample for the measurement.

In addition, hydrogen atoms of at least some of the phenolic hydroxyl groups of the phenol multimer may be substituted with an alkali metal. Substituting some hydrogen atoms (H) of phenol multimer's hydroxyl groups of the phenol multimeric mixture with alkali metals at the time the phenol multimeric mixture is re-precipitated under an alkaline condition can improve charging characteristics of the phenol multimeric mixture when it is used as an electrostatic charge image developing toner. This is because when some hydrogen atoms (H) of the phenolic hydroxyl group are substituted with alkali metals, the phenolic hydroxyl groups in the vicinity of the central metal is considered to coordinate to the metal to have a configuration favorable to charging.

The content of the alkali metal to substitute H of the hydroxyl group of the phenol multimers of the phenol multimeric mixture is preferably in the range of 0.1-3.0%, more preferably 0.5-2.5% by weight. When less than 0.1% by weight, the effect of the metal on the configuration is not sufficient, and when more than 3.0% by weight, water adheres to an excess metal, adversely affecting the environmental stability.

When some hydrogen atoms (H) of the phenolic hydroxyl group of the phenol multimer are substituted with alkali metals, the integral value obtained from $^1$H-NMR spectrum analysis varies. However, the average degree of polymerization of phenol multimeric mixture, which is defined in this application, may not vary by this alkali metalization.

Therefore, in the case of the phenol multimeric mixture in which some of the hydrogen atoms of phenolic hydroxyl groups of the phenol multimer shown in the chemical formula (1) described above is substituted with alkali metal, the average degree of polymerization obtained from the phenol multimeric mixture is used here as a substitute for that of the alkali metal-substituted phenol multimeric mixture, by using the integral ratio between the signal appearing on the low magnetic field side and the signal appearing on the high magnetic field side in the $^1$H-NMR spectrum of the phenol multimeric mixture having an alkali metal-unsubstituted phenolic hydroxyl group.

As examples of the alkali metal to substitute hydrogen atoms of hydroxyl groups of the phenol multimeric mixture, lithium, sodium, potassium, etc. can be exemplified. As an example of compound which is used for alkali metallization, for example, publicly known alkali metal hydroxides such as sodium hydroxide, potassium hydroxide, lithium hydroxide, etc.; inorganic acids salt of alkali metal such as sodium carbonate, sodium hydrogen carbonate, potassium carbonate, potassium hydrogen carbonate, sodium phosphate, lithium hydrogen carbonate can be exemplified.

In the synthesis of the phenol multimer, the phenol multimer is generally obtained by adding the reacted solvent into a weakly alkaline water to precipitate crystals and then the crystals are filtered. At this time, impurities such as a dichloro compound included in some raw materials, unreacted raw materials, reaction intermediates, side-reaction products, etc. are often mixed into the phenol multimer. The phenol multimeric mixture which is used as the charge control agent has low solubility in the reaction solvent, so that after the completion of the reaction, it is preferable to carry out a process including purification such as filtration of the reacted solution, washing with a hydrophilic solvent such as methanol, THF, ethylene glycol monomethyl ether, etc., and then filtration after adding the washed product into a weak alkaline water.

In addition, another purification method such as dissolving the phenol multimeric mixture into a good solvent such as DMF which has excellent solubility, etc., and then adding the dissolved solution into a poor solvent such as water or a hydrophilic solvent, may be adopted.

In order to improve the charge granting effect of the charge control agent, it is better to substitute the para position of the phenol (an aromatic ring) of the phenol multimer with electron-withdrawing group to increase an electronic bias and accordingly to cause electronic unstability. When a nitro group or carboxyl group is used as an electron-withdrawing substituent, the obtained compound tends to have too high polarity, so that the compound becomes too familiar with the toner resin having a polar group, and the phenol multimer is likely to disperse uniformly throughout the resin. When such phenol multimers are used together with polymerized toners which are the important use of the charge control agents, such phenol multimers are familiar with resins, so that the charge control agents are easily incorporated into the resin particles. Accordingly, it is difficult for the charge control agent to come out on the surface of the toner particles, and sufficient charging effect cannot be achieved.

Thus, if a compound has a substituent such as a halogen atom that is an electron-withdrawing group but has low polarity as possible, the compound does not familiar with a resin having high polarity. Thus the compound is extruded out onto the surface of the resin, and the charge control agent tends to be more easily distributed on the surface of the resin.

Then chlorine atom is selected from among the halogen atoms as a substituent, because chlorine atom has a small atomic radius and accordingly has small polarity. In addition, the raw material from which chlorine is produced is easily obtainable, thus being more preferable.

Further, when the degree of polymerization is low, the solubility of polymer in a solvent is generally high. Accordingly, in the case of polymerized toner, the phenol multimer also tends to become uniformly dispersed in the resin so that it is difficult to exhibit proper charging characteristics. Therefore, the degree of polymerization is made higher to some extent to lower the solubility in the solvent. Thus, the charge control agent having chlorine groups and having phenol multimers whose degree of polymerization are adjusted to maintain a particle state, is likely to exhibit charging characteristics. Therefore, the charge control agent of the present invention is suitable for the polymerized toner.

Therefore, the charge control agent of the present invention comprises the phenol multimeric mixture containing the phenol multimer as the active ingredient represented by the chemical formula (1) whose degree of condensation is further adjusted under consideration of the compatibility with the resin used in the toner. The charge control agent comprising the phenol multimeric mixture exhibits excellent charging characteristics when used as an electrostatic image developing toner.

The electrostatic charge image developing toner of the present invention is a powdery mixture comprising at least a charge control agent comprising a phenol multimeric mixture, a resin for toner, and colorant. Also, the electrostatic image developing toner of the present invention is a material that is polymerized from a mixture containing at least a charge control agent comprising a phenol multimeric mixture, a polymerisable monomer, a polymerization initiator and colorant. The phenol multimeric mixture containing phenol multimers represented by the chemical formula (1) above, which is the active ingredient of the charge control agent in the toner, may be a mixture, in any composition ratio, of each component of the phenol multimer represented by the chemical formula (1).

The electrostatic charge image developing toner of the present invention may contain other charge control agent or agents, for example, a complex of azo metal (Fe, Cr, Al) and a complex of salicylic acid metal (Al, Zn, Cr, Zr), etc. within an amount that does not impair the effects of the present invention.

In the electrostatic image developing toner of the present invention, preferably 0.1-10 parts by weight, more preferably 0.5-5 parts by weight of the phenol multimeric mixture, i.e. charge control agent, is added with respect to 100 parts by weight of the toner resin.

As the resin for toner used in the electrostatic charge image developing toner, a toner binder resin or a publicly known resin for toners can be used. As the resin for toner, for example, a thermoplastic resin such as styrene resins, styrene-acrylic resins, styrene-butadiene resins, styrene-maleic acid resins, styrene-vinyl methyl ether resins, styrene-methacrylic acid ester copolymers, polyester resins, polypropylene resins, etc. can be exemplified. These resins may be used alone or may be used in a mixture of two or more.

In addition, the charge control agent of the present invention can also be used for controlling (intensifying) the charge of the resin powder which is included in electrostatic powder paints. As examples of the resin for paints, for example, a thermoplastic resin such as acrylic resins, polyolefin resins, polyester resins, polyamide resins; thermosetting resins such as phenolic resins, epoxy resins, etc. can be exemplified. These coating resins may be used alone or in combination of two or more.

An acid value of the resin used in the toner for developing electrostatic image of the present invention is preferably in the range of 0.1 mg KOH/g-100 mg KOH/g, more preferably in the range of 0.1 mgKOH/g-70 mgKOH/g, still more preferably in the range of 0.1 mgKOH/g-50 mgKOH/g.

When producing an electrostatic charge image developing toner, the toner resin or a resin having a good dispersibility with the toner resin, and the charge control agent may be previously mixed, melted, cooled, solidified, pulverized, and then used as a master batch in order to improve the dispersion of the charge control agent in the resin.

In the toner of the present invention, various dyes and pigments may be used alone respectively or in combination of two or more as coloring agents. As specific examples of colorants, organic pigments such as an azo yellow, azomethine yellow, quinophthalone yellow, isoindolinone yellow, benzidine yellow, perinone orange, perinone red, perylene maroon, rhodamine 6G lake, quinacridone red, anthanthrone red, rose bengal, copper phthalocyanine blue, copper phthalocyanine green, and diketopyrrolopyrrole containing pigments; inorganic pigments and metal powders such as carbon black, titanium white, titanium yellow, ultramarine blue, cobalt blue, red iron oxide, aluminum powder, etc.; various oil-soluble dyes and disperse dyes such as azo dyes, quinophthalone dyes, anthraquinone dyes, phthalocyanine dyes, indophenol dyes, indoaniline dyes, etc.; triarylmethane dyes and xanthene dyes which are modified by resin such as rosin, rosin-modified phenol, rosin-modified maleic acid, etc. can be exemplified.

For example, the electrostatic image developing toner of the present invention is produced as follows.

The toner resin, colorant, charge control agent of the present invention as described above and, if necessary, a magnetic material (for example, fine powder made of ferromagnetic material such as iron, cobalt, ferrite, etc.), fluidity modifier (e.g., silica, aluminum oxide, titanium oxide), an offset preventing agent (e.g., wax, low molecular weight olefin wax), etc. are mixed thoroughly using a ball mill or other mixers. The mixture is melt-kneaded using a thermo kneader such as a heating roll, kneader, extruder, etc. The kneaded mixture is cooled, solidified, pulverized, and classified to obtain a toner having an average particle size of 5-20 μm.

Further, as a method to obtain the toner powder, following method can be exemplified in which materials such as the charge control agent, colorant, etc. are dispersed in the solution of the binder resin and then the obtained solution is spray-dried to produce the toner powder.

Further, the polymerized toner can be obtained by the following manufacturing method. Predetermined materials are added into a monomer to constitute a binder resin and mixed to prepare an emulsified suspension. Then the suspension is polymerized, obtaining the toner (so-called a polymerized toner).

For example, in the suspension polymerization, a polymerizable monomer, colorant, a charge control agent, and if necessary a polymerization initiator, crosslinking agent, mold release agent, and other additives are dissolved or dispersed uniformly, to obtain a monomer composition. The monomer composition is dispersed using an appropriate dispersing machine in a continuous phase (aqueous phase for example) containing a dispersion stabilizer, to carry out a polymerization reaction and to obtain a toner particle having a desired particle size.

As examples of the polymerizable monomers for forming a resin for a polymerized toner, styrene-base monomers such as styrene, o-methyl styrene, m-methyl styrene, p-methyl styrene, p-methoxy styrene, p-ethyl styrene, etc.; acrylic acid esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloro ethyl acrylate, phenyl acrylate, etc.; methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, etc.; and vinyl monomers such as acrylonitrile, methacrylonitrile, acrylamide, etc. can be exemplified.

As the dispersion stabilizers, various surfactants or organic or inorganic dispersing agents, etc. can be used. As examples of the surfactants, sodium dodecyl benzene sulfate, sodium tetradecyl sulfate, sodium pentadecyl sulfate, sodium octyl sulfate, sodium oleate, sodium laurate, sodium stearate, potassium stearate, etc. can be exemplified.

As examples of the organic dispersants, polyvinyl alcohol, gelatin, methyl cellulose, methyl hydroxypropyl cellulose, ethyl cellulose, etc. can be exemplified.

As examples of the inorganic dispersants, a polyvalent metal salt of phosphoric acid fine powder such as calcium phosphate, magnesium phosphate, aluminum phosphate, zinc phosphate, etc.; carbonate fine powder such as calcium carbonate, magnesium carbonate; inorganic salts such as calcium metasilicate, calcium sulfate, barium sulfate; inorganic hydroxides such as calcium hydroxide, magnesium hydroxide, aluminum hydroxide, etc.; inorganic oxides such as silica, bentonite, alumina, magnetic material, ferrite, etc. can be exemplified.

As the polymerization initiator, an azo or diazo-containing polymerization initiator such as 2,2'-azobis(2,4-dimethylvaleronitrile), 2,2'-azobisisobutyronitrile, 1,1'-azobis(cyclohexane-1-carbonitrile), 2,2'-azobis(4-methoxy-2,4-dimethylvaleronitrile), azobisisobutyronitrile, etc.; peroxide-containing polymerization initiator such as benzoyl peroxide, methyl ethyl ketone peroxide, diisopropylperoxycarbonate, cumene hydroperoxide, 2,4-dichlorobenzoyl peroxide, lauroyl peroxide, t-butyl peroxy 2-ethylhexanoate, t-butylperoxypivalate, etc. can be exemplified.

As the crosslinking agent, a compound having two or more polymerizable double bonds are used primarily, for example, aromatic divinyl compound such as divinylbenzene, divinylnaphthalene, etc.; carboxylic acid esters having two double bonds such as ethylene glycol diacrylate, ethylene glycol dimethacrylate, 1,3-butanediol dimethacrylate, etc.; divinyl compounds such as divinylaniline, divinyl ether, divinyl sulfide, and divinyl sulfone; and a compound having three or more vinyl groups, can be exemplified.

As the mold release agent, petroleum wax and derivatives thereof such as paraffin wax, microcrystalline wax, and petrolatum; montan wax and its derivatives; hydrocarbon wax produced by Fischer-Tropsch process and its derivatives; polyolefin waxes and their derivatives typified by polyethylene; natural waxes and their derivatives such as carnauba wax, candelilla wax, etc.; can be exemplified. And the derivatives include oxides, block copolymers with vinyl monomers, and graft modified products. In addition, a fatty acid such as higher aliphatic alcohol, stearic acid, palmitic acid or their compounds, acid amide waxes, ester waxes, ketones, hydrogenated castor oil and their derivatives, vegetable waxes, animal waxes, etc. can be exemplified.

In emulsion polymerization, for example, if necessary, a release agent, a charge control agent and a polymerization initiator, etc. are added into the polymerizable monomer and dissolved or dispersed. Then, a desired size of oil droplets as fine resin particles is made in an aqueous medium using a homogenizer or homomixer. After that, the dispersion is heated in a reaction vessel with a stirrer to initiate a polymerization reaction. Then colorant and a coagulant are added to exceed the value of the critical coagulation concentration for causing salting out and at the same time heat fusion at a temperature higher than the glass transition temperature of the polymer to obtain a toner having a desired particle size.

As the polymerizable monomers, in addition to those described above, olefins such as ethylene, propylene, isobutylene, etc.; vinyl halides such as vinyl chloride vinylidene chloride, vinyl bromide, vinyl fluoride, vinylidene fluoride, etc.; vinyl esters such as vinyl propionate, vinyl acetate, vinyl benzoate, etc.; vinyl ethers such as vinyl methyl ether, vinyl ethyl ether, etc.; vinyl ketones such as vinyl methyl ketone, vinyl ethyl ketone, vinyl hexyl ketone, etc.; N-vinyl compounds such as N-vinylcarbazole, N-vinylindole, N-vinylpyrrolidone, etc.; vinyl compounds such as vinylnaphthalene, vinylpyridine, etc.; acrylic acids or methacrylic acid derivatives such as acrylonitrile, methacrylonitrile, acrylamide, etc., can be exemplified.

As the polymerization initiators, in addition to those mentioned above, persulfates such as potassium persulfate, ammonium persulfate, etc.; azobisaminodipropane acetate, azobiscyanovaleric acid and salts thereof, hydrogen peroxide, etc. can be exemplified.

As the coagulants, monovalent metal salts such as salts of alkali metal such as sodium, potassium, lithium, etc.; divalent metal salts such as salts of alkaline earth metal such as calcium, magnesium, etc.; salts of divalent metals such as manganese, copper, etc.; and salts of trivalent metal such as iron, aluminum, etc. can be exemplified. As specific examples of salts, sodium chloride, potassium chloride, lithium chloride, calcium chloride, zinc chloride, copper sulfate, magnesium sulfate, manganese sulfate, etc. can be exemplified.

In case of preparing polyester-containing polymers, as the polycondensation monomers for forming polyester polymers, polycarboxylic acids, polyols, and hydroxy carboxylic acids described below are exemplified.

As polycarboxylic acids which can be used as monomers for polycondensation, compounds containing two or more carboxyl groups in one molecule can be exemplified. Of them, dicarboxylic acids are compounds having two carboxyl groups in one molecule. For example, oxalic acid, glutaric acid, succinic acid, maleic acid, adipic acid, methyl adipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid, chlorophthalic acid, nitrophthalic acid, p-carboxyphenyl acetate, p-phenylene diacetate, m-phenylenediglycolic acid, p-phenylenediglycolic acid, o-phenylenediglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, cyclohexanedicarboxylic acid, etc. are exemplified. As examples of polycarboxylic acids other than dicarboxylic acids, trimellitic acid, pyromellitic acid, naphthalenetricarboxylic acid, naphthalenetetracarboxylic acid, pyrenetricarboxylic acid, pyrenetetracarboxylic acid, etc. can be exemplified. In addition, acid anhydrides, mixed acid anhydrides, acid chlorides or esters all of which are derived from those carboxylic acids by modifying the carboxyl groups of those carboxylic acids may be used.

In addition, the polyols that can be used as polycondensation monomers are compounds containing two or more hydroxyl groups in one molecule. Among them, diols are compounds containing two hydroxyl groups in one molecule. As the diols, ethylene glycol, propylene glycol, butanediol, diethylene glycol, hexanediol, cyclohexanediol, octanediol, decanediol, dodecanediol can be exemplified. As polyols other than diols, glycerol, pentaerythritol, hexamethylol melamine, hexaethylol melamine, tetramethylol benzoguanamine, tetraethylol benzoguanamine, etc. can be exemplified.

In addition, as the hydroxycarboxylic acids that can be used as the polycondensation monomer, hydroxyheptanoic acid, hydroxyoctanoic acid, hydroxydecanoic acid, hydroxyundecanoic acid, etc. can be exemplified.

When the electrostatic charge image developing toner of the present invention is used as a two-component developer, this toner can be used by mixing with a carrier powder to develop an image using a magnetic brush developing technique or the like.

The carrier is not particularly limited and any publicly known carrier can be used. For example, a fine powder of about 50-200 μm diameter such as iron powder, nickel powder, ferrite powder, glass beads, and such fine powders the surface of which is coated with acrylic acid ester copolymer, styrene-acrylic acid ester copolymer, styrene-methacrylic acid ester copolymer, silicone resin, polyamide resin, polyethylene fluoride resin, or the like can be exemplified.

When the toner of the present invention is used as a one-component developer, and when producing the toner as described above, an appropriate amount of fine powder made of a ferromagnetic material such as iron powder, nickel powder, or ferrite powder may be added and dispersed in the toner. As a development method for this case, a contact development, a jumping development or the like can be exemplified.

In the development of an electrostatic image using the toner of the present invention, the present charge control agent in the toner performs the charge control of the toner or the resin powder.

EMBODIMENTS

Embodiments of the present invention are detailed more, but the present invention is not limited by these embodiments. Hereinafter, the term of "parts by weight" is abbreviated as "parts".

Synthesis examples of phenol multimeric mixtures which constitute charge control agents are shown in Examples 1-10. Synthesis examples of phenol multimers which constitute charge control agents which are out of the scope of the present invention are shown in Comparative Examples 1-6.

Example 1

Synthesis of Chlorophenol of 20-21-mers

Under a nitrogen atmosphere, 38.6 g (0.300 mol) of 4-chlorophenol was dissolved in 99.0 g of acetic acid with stirring. 9.79 g (0.300 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction, washed with 2 L of water, obtaining a filtered residue which was then dried at 80° C. to obtain crystals whose weight was 41.6 g.

$^1$H-NMR spectrum of the obtained phenol multimeric mixture was measured. Among the signals based on the phenolic hydroxyl group of the phenol multimer, the integral ratio between the signal that appeared on the low magnetic field (9.905 ppm) side and the signal that appeared on the high magnetic field (8.996 ppm) side was 2:18.49, the sum of them being 20.49. The phenol multimer was assumed to be 20-21-mers. In addition, within the range of 4-6 ppm, 4 signals were observed at 4.55 ppm, 4.88 ppm, 5.06 ppm, and 5.29 ppm. Therefore, the phenol multimeric mixture was considered to contain a stilbene skeleton structure in which two phenol multimers were bound by a vinylene group. In addition, $^1$H-NMR spectrum measurement (JNM-AL300, NMR measurement apparatus manufactured by JEOL Ltd.) was carried out using deuterated dimethyl sulfoxide (DMSO-d$_6$) as a solvent. The $^1$H-NMR spectrum chart is shown in FIG. 1.

Figure 2:
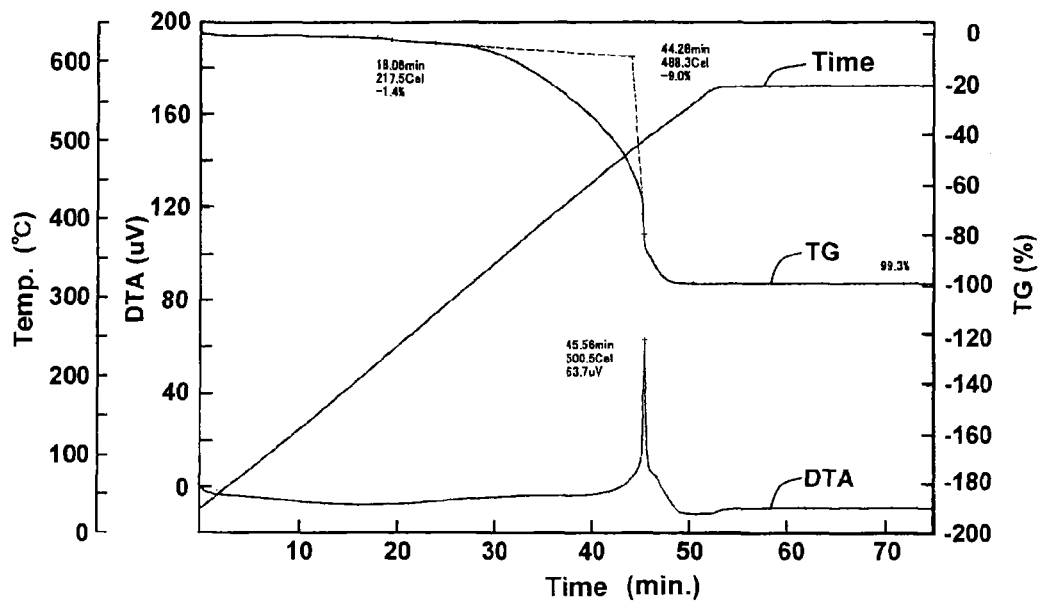
FIG. 2 shows a thermogravimetry-differential thermal analysis chart of the charge control agent of Example 1 of the present invention.

The obtained phenol multimeric mixture was measured using EXSTAR TG/DTA6200 Thermo-Gravimetry/Differential Thermal Analyzer manufactured by SII NanoTechnology Inc., under conditions of a heating rate of 10° C./minute and a temperature range of 30-550° C. FIG. 2 shows the measurement results of this thermogravimetry-differential thermal analysis (TG-DTA).

The obtained phenol multimeric mixture was analyzed using fully automatic elemental analyzer 240011 (CHNS/O analysis) manufactured by PerkinElmer, Inc. and Total Sulfur/Chlorine Analyzer TOX-2100H manufactured by Mitsubishi Analytic Co., LTD. Weight ratios of carbon (C), hydrogen (H), and total chlorine (Cl) were measured. Measured values and theoretical values obtained by elemental analysis are shown in Table 1.

TABLE 1

|  | Carbon (%) | Hydrogen (%) | Total chloride (%) |
| --- | --- | --- | --- |
| Theoretical value (20-mers) | 59.64 | 3.60 | 25.33 |
| Measured value | 58.91 | 3.28 | 21.84 |

Figure 3:
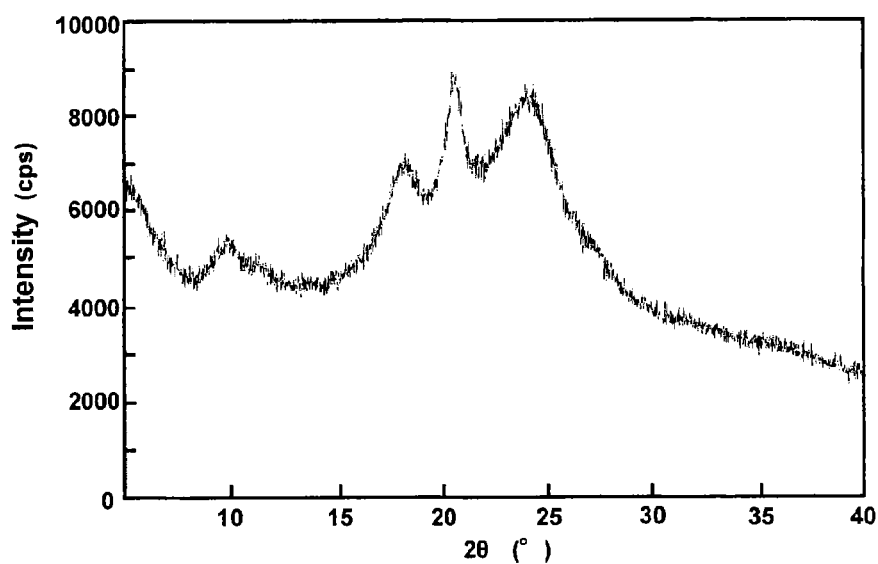
FIG. 3 shows an X-ray diffraction spectrum chart of the charge control agent of Example 1 of the present invention.

The obtained phenol multimeric mixture was subjected to X-ray diffraction analysis using X-ray diffraction analyzer (RINT TTRIII, manufactured by Rigaku Corporation). A sharp peak at the Bragg angle (2θ±0.2°) of 20.4° and slightly broad peaks at positions of 9.9°, 18.2°, and 24.1° were observed. The X-ray diffraction spectrum chart is shown in FIG. 3. In addition, measurement conditions were as follows, target: Cu, filter: Kβ filter, monochrometer: not used, divergence slit: 2/3°, divergence longitudinal restriction slit: 10 mm, scattering slit: 2/3°, receiving slit: 0.3 mm.

Example 2

Synthesis of Chlorophenol of 29-30-mers

Under a nitrogen atmosphere, 38.6 g (0.300 mol) of 4-chlorophenol was dissolved in 99.0 g of acetic acid with stirring. 10.8 g (0.330 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction, washed with 2 L of water, obtaining a filtered residue which was then dried at 80° C., to obtain crystals whose weight was 43.8 g.

In the same manner as shown in Example 1, $^1$H-NMR measurement, TG-DTA measurement, elemental analysis, and total chlorine analysis of the obtained phenol multimeric mixture were carried out.

Figure 4:
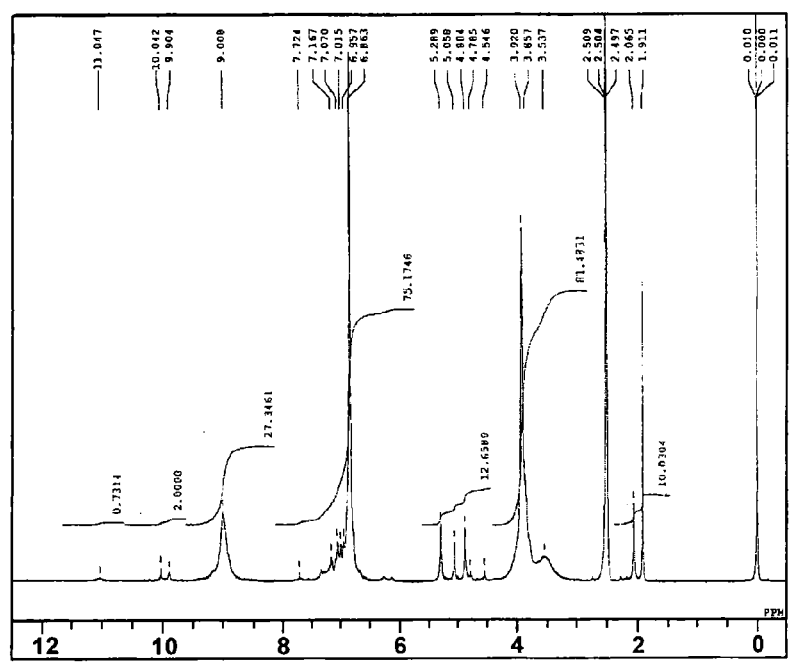
FIG. 4 shows a Nuclear Magnetic Resonance (NMR) chart of the charge control agent of Example 2 of the present invention.

$^1$H-NMR spectrum of the obtained phenol multimeric mixture was measured. Among the signals based on the phenolic hydroxyl group of the phenol multimer, the integral ratio between the signal that appeared on the low magnetic field (9.904 ppm) side and the signal that appeared on the high magnetic field (9.008 ppm) side was 2:27.35, the sum of them being 29.35. The phenol multimer was assumed to be 29-30-mers. In addition, within the range of 4-6 ppm, 3 signals were observed at 4.88 ppm, 5.06 ppm, and 5.29 ppm. Therefore, the phenol multimeric mixture was considered to contain a stilbene skeleton structure in which two phenol multimers were bound by a vinylene group. The $^1$H-NMR spectrum chart is shown in FIG. 4.

Figure 5:
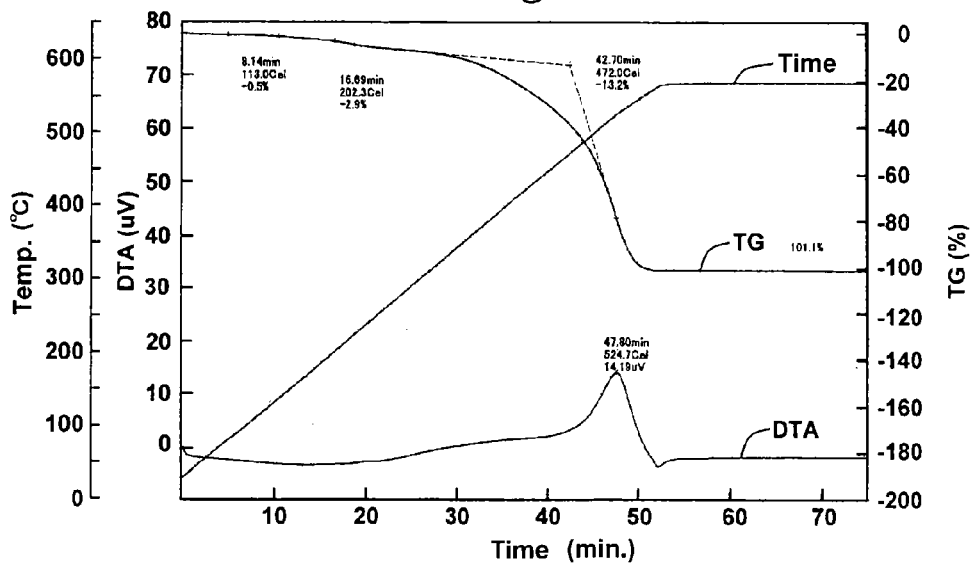
FIG. 5 shows a thermogravimetry-differential thermal analysis chart of the charge control agent of Example 2 of the present invention.

Measurement results of TG-DTA are shown in FIG. 5.

Theoretical and measured values of elemental analysis are shown in Table 2.

TABLE 2

|  | Carbon (%) | Hydrogen (%) | Total chloride (%) |
|---|---|---|---|
| Theoretical value (30-mers) | 59.70 | 3.60 | 25.29 |
| Measured value | 59.10 | 3.29 | 22.73 |

Example 3

Synthesis of Chlorophenol of 21-22-mers

Under a nitrogen atmosphere, 80.7 g (0.300 mol) of bis(5-chloro-2-hydroxyphenyl)methane that is represented by the chemical formula (16) was dissolved in 99.0 g of acetic acid with stirring. 9.79 g (0.300 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing a precipitate was added into 3 L of 5% sodium hydrogen carbonate aqueous solution with stirring to further precipitate crystals. The reaction mixture obtained was filtered with suction, washed with 2 L of water, obtaining a filtered residue which was then dried at 80° C. to obtain crystals whose weight was 82.6 g.

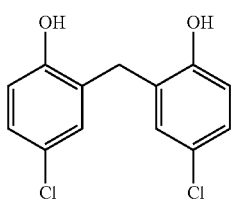

(16)

In the same manner as shown in Example 1, $^1$H-NMR measurement, TG-DTA measurement, elemental analysis, total chlorine analysis, and X-ray diffraction analysis of the obtained phenol multimeric mixture were carried out.

Figure 6:
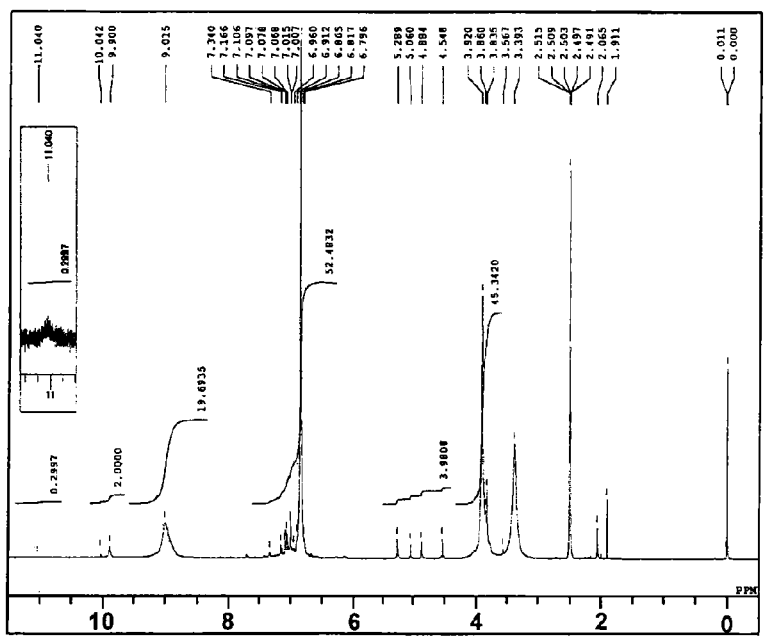
FIG. 6 shows a Nuclear Magnetic Resonance (NMR) chart of the charge control agent of Example 3 of the present invention.

$^1$H-NMR spectrum of the obtained phenol multimeric mixture was measured. Among the signals based on the phenolic hydroxyl group of the phenol multimer, the integral ratio between the signal that appeared on the low magnetic field (9.900 ppm) side and the signal that appeared on the high magnetic field (9.015 ppm) side was 2:19.69, the sum of them being 21.69. The phenol multimer was assumed to be 21-22-mers. In addition, within the range of 4-6 ppm, 4 signals were observed at 4.5 ppm, 4.88 ppm, 5.06 ppm, and 5.29 ppm. Therefore, the phenol multimeric mixture was considered to contain a stilbene skeleton structure in which two phenol multimers were bound by a vinylene group. The $^1$H-NMR spectrum chart is shown in FIG. 6.

Figure 7:
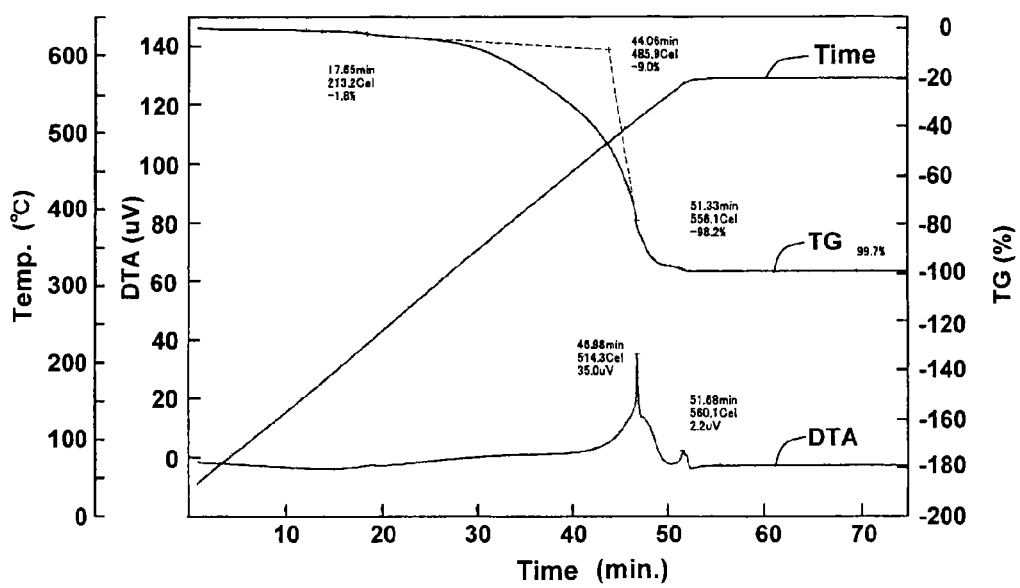
FIG. 7 shows a thermogravimetry-differential thermal analysis chart of the charge control agent of Example 3 of the present invention.

Measurement results of TG-DTA are shown in FIG. 7.

Theoretical and measured values of elemental analysis are shown in Table 3.

TABLE 3

|  | Carbon (%) | Hydrogen (%) | Total chloride (%) |
|---|---|---|---|
| Theoretical value (21-mers) | 59.65 | 3.60 | 25.32 |
| Measured value | 58.98 | 3.25 | 20.47 |

Figure 8:
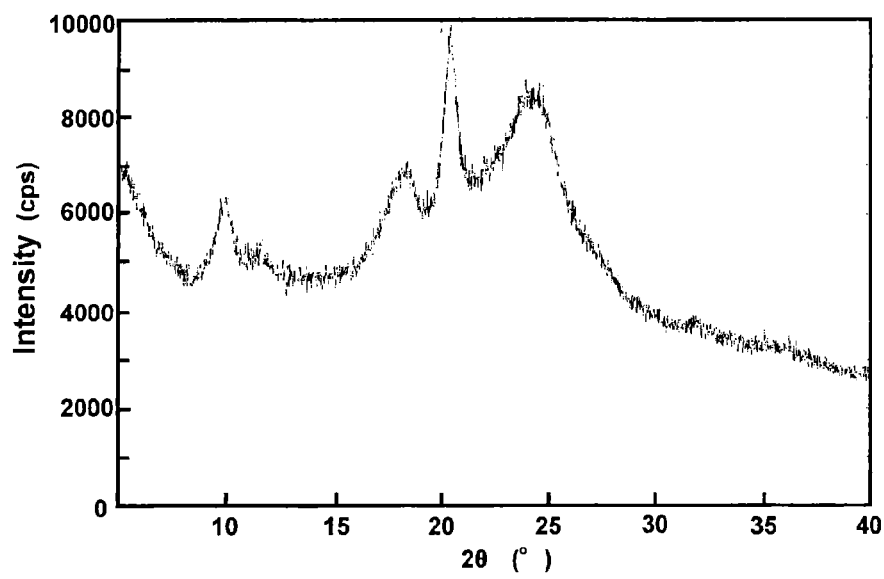
FIG. 8 shows an X-ray diffraction spectrum chart of the charge control agent of Example 3 of the present invention.

The obtained phenol multimeric mixture was subjected to X-ray diffraction analysis. Sharp peaks at the Bragg angle (2θ±0.2°) of 9.9° and 20.4°, a slightly sharp peak at a position of 18.2° and a slightly broad peak at a position of 24.1° were observed. The X-ray diffraction spectrum chart is shown in FIG. 8.

Example 4

Synthesis of Chlorophenol of 18-19-mers

Under a nitrogen atmosphere, 38.6 g (0.300 mol) of 4-chlorophenol was dissolved in 99.0 g of acetic acid with stirring. 9.01 g (0.100 mol) of 1,3,5-trioxane was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction, washed with 2 L of water, obtaining a filtered residue which was then dried at 80° C. to obtain crystals whose weight was 40.1 g.

In the same manner as shown in Example 1, $^1$H-NMR measurement of the obtained phenol multimeric mixture was carried out.

$^1$H-NMR spectrum of the obtained crystals was measured. Among the signals based on the phenolic hydroxyl group of the phenol multimer, the integral ratio between the signal that appeared on the low magnetic field side and the signal that appeared on the high magnetic field side was 2:16.72, the sum of them being 18.72. The phenol multimer was assumed to be 18-19-mers. In addition, within the range of 4-6 ppm, 4 signals were observed at 4.55 ppm, 4.88 ppm, 5.06 ppm, and 5.29 ppm. Therefore, the crystals were considered to be a phenol multimeric mixture which contains a stilbene skeleton structure in which two phenol multimers are bound together by a vinylene group.

Example 5

Synthesis of 25-26-MERS Obtained by the Manufacturing Method Comprising a Step of Purification by Solvent Under a nitrogen atmosphere, 38.6 g (0.300 mol) of 4-chlorophenol was dissolved in 99.0 g of acetic acid with stirring. 9.79 g (0.300 mol) of paraformaldehyde (92% purity) was added thereto and it was heated up to 80° C. To this solution, a solution which was mixed of 3.0 g of concentrated sulfuric acid and 9.0 g of acetic acid was added dropwise. After that, reaction was carried out with stirring at 110° C. for 3 hours, then cooled. The obtained reaction mixture containing precipitate was filtered with suction and washed with 50 mL of methanol. The filtered crystals were added into 500 mL of 1% sodium hydrogen carbonate aqueous solution with stirring to disperse the crystals. The reaction mixture obtained was filtered with suction, washed with 500 mL of water, obtaining a filtered residue which was then dried at 80° C. to obtain crystals whose weight was 39.8 g.

The obtained phenol multimeric mixture was analyzed using a headspace sampler G1888, gas chromatographic mass spectrometer 6890N/5973N GC/MSD manufactured by Agilent Technologies, Inc. It was confirmed that there was no impurities that vaporize at 150° C.

In the same manner as shown in Example 1, $^1$H-NMR measurement, TG-DTA measurement, elemental analysis, total chlorine analysis, and X-ray diffraction analysis of the obtained phenol multimeric mixture were carried out.

$^1$H-NMR spectrum of the obtained phenol multimeric mixture was measured. Among signals based on the phenolic hydroxyl group of the phenol multimer, the integral ratio between the signal that appeared on the low magnetic field side and the signal that appeared on the high magnetic field side was 2:23.90, the sum of them being 25.90. The phenol multimer was assumed to be 25-26-mers. In addition, within the range of 4-6 ppm, 4 signals were observed at 4.55 ppm, 4.88 ppm, 5.06 ppm, and 5.29 ppm. Therefore, the phenol multimeric mixture was considered to contain a stilbene skeleton structure in which two phenol multimers were bound by a vinylene group.

Figure 9:
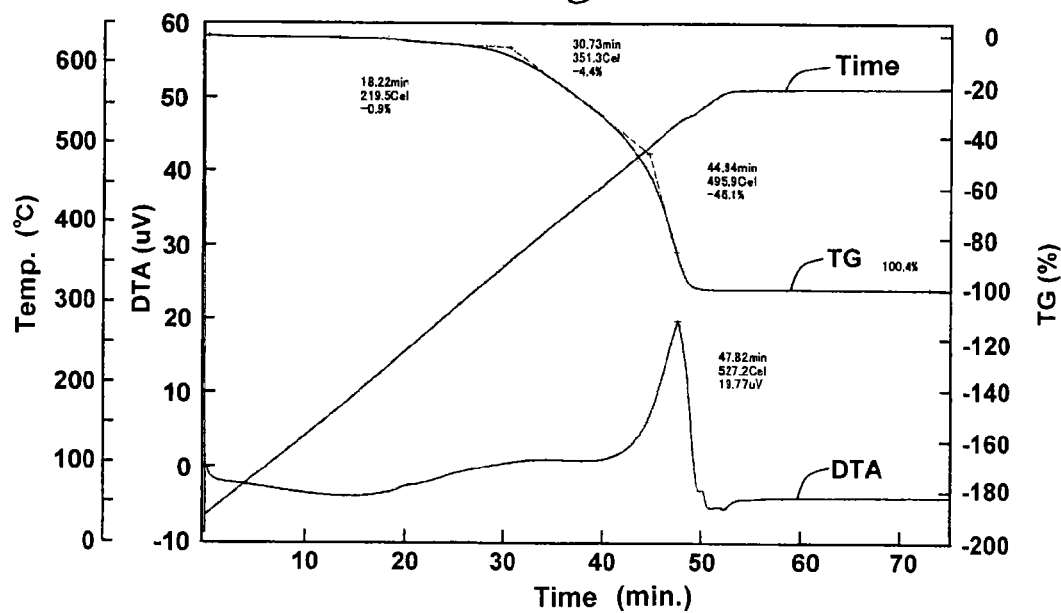
FIG. 9 shows a thermogravimetry-differential thermal analysis chart of the charge control agent of Example 5 of the present invention.

Measurement results of TG-DTA are shown in FIG. 9.

Theoretical and measured values of elemental analysis are shown in Table 4.

TABLE 4

|  | Carbon (%) | Hydrogen (%) | Total chloride (%) |
|---|---|---|---|
| Theoretical value (25-mers) | 59.67 | 3.60 | 25.31 |
| Measured value | 59.05 | 3.25 | 22.96 |

Figure 10:
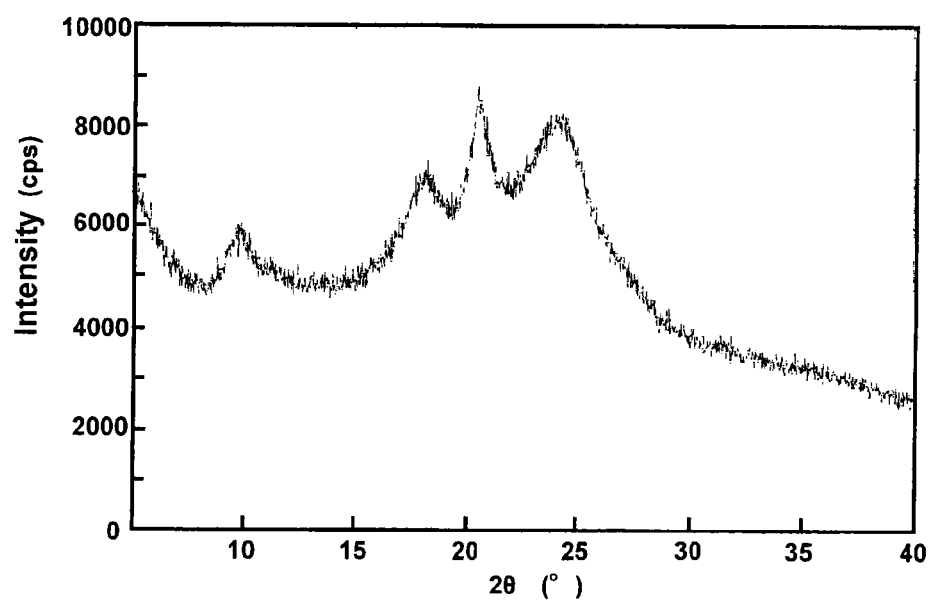
FIG. 10 shows an X-ray diffraction spectrum chart of the charge control agent of Example 5 of the present invention.

The obtained phenol multimeric mixture was subjected to X-ray diffraction analysis. A Sharp peak at the Bragg angle (2θ±0.2°) of 20.4°, a slightly sharp peak at positions of 9.9° and 18.2°, and a slightly broad peak at 24.1° were observed. The X-ray diffraction spectrum chart is shown in FIG. 10.

Example 6

Synthesis of 25-26-mers Obtained by the Manufacturing Method Comprising a Step of Purification by Solvent Under a nitrogen atmosphere, 80.7 g (0.300 mol) of bis(5-chloro-2-hydroxyphenyl)methane was dissolved in 99.0 g of acetic acid with stirring. 9.79 g (0.300 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was filtered with suction and washed with 200 mL of methanol. The filtered crystals were added into 1 L of 1% sodium hydrogen carbonate aqueous solution with stirring to disperse the crystals. Thus obtained reaction mixture was filtered with suction and washed with 1 L of water, obtaining a filtered residue which was then dried at 80° C. to obtain crystals whose weight was 80.7 g.

In the same manner as shown in Example 5, the obtained phenol multimeric mixture was analyzed using the headspace gas chromatography, it was confirmed that the obtained phenol multimeric mixture released no impurities.

In the same manner as Example 1, $^1$H-NMR measurement, elemental analysis, total chlorine analysis, and X-ray diffraction analysis of the obtained phenol multimeric mixture were carried out.

$^1$H-NMR spectrum of the obtained phenol multimeric mixture was measured. Among the signals based on the phenolic hydroxyl group of the phenol multimer, the integral ratio between the signal that appeared on the high magnetic field side and the signal that appeared on the low magnetic field side was 2:23.12, the sum of them being 25.12. The phenol multimer was assumed to be 25-26-mers. In addition, within the range of 4-6 ppm, 4 signals were observed at 4.55 ppm, 4.88 ppm, 5.06 ppm, and 5.28 ppm. Therefore, the phenol multimeric mixture was considered to contain a stilbene skeleton structure in which two phenol multimers are bound by a vinylene group.

Theoretical and measured values of elemental analysis are shown in Table 5.

TABLE 5

|  | Carbon (%) | Hydrogen (%) | Total chloride (%) |
|---|---|---|---|
| Theoretical value (25-mers) | 59.67 | 3.60 | 25.31 |
| Measured value | 59.13 | 3.22 | 23.01 |

Figure 11:
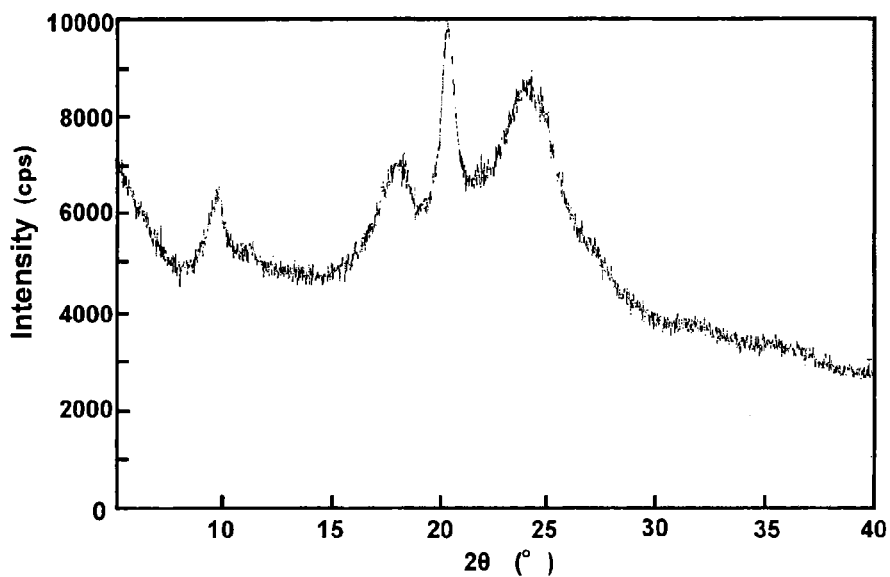
FIG. 11 shows an X-ray diffraction spectrum chart of the charge control agent of Example 6 of the present invention.

The obtained phenol multimeric mixture was subjected to X-ray diffraction analysis. Sharp peaks at the Bragg angle (2θ±0.2°) of 9.9° and 20.4°, a slightly sharp peak at a position of 18.2° and a slightly broad peak at a position of 24.1° were observed. The X-ray diffraction spectrum chart is shown in FIG. 11.

Example 7

Synthesis of 20-21-mers Some Hydrogen Atoms of Phenolic Hydroxyl Group of which are Substituted with Sodium 30.0 g of the 20-21-mers obtained in Example 1 was dissolved by heating in 300 mL of N,N-dimethylformamide with stirring. This solution was added to 3 L of 5% sodium hydrogen carbonate aqueous solution with stirring to precipitate crystals. Then this obtained reaction mixture was filtered with suction and washed with 2 L of water, obtaining a filtered residue. The residue was dried at 80° C. to obtain crystals whose weight was 29.8 g.

Atomic absorption analysis was carried out by at first putting a sample and then nitric acid into a decomposing container, then decomposition was performed by a decomposer (Microwave Accelerated Reaction System MARS 5 produced by CEM Corporation). The decomposed liquid was adjusted up to a specified volume using PP volumetric flask produced by Nalgene. Then measurement was conducted using atomic absorption spectrophotometer (SPECTRA A-220FS manufactured by Varian Medical Systems, Inc.,).

The weight ratio of sodium in the phenol multimeric mixture was 1.02% by weight.

In the same manner as shown in Example 1, TG-DTA measurement, elemental analysis, total chlorine analysis, and X-ray diffraction analysis of the obtained phenol multimeric mixture were carried out.

Figure 12:
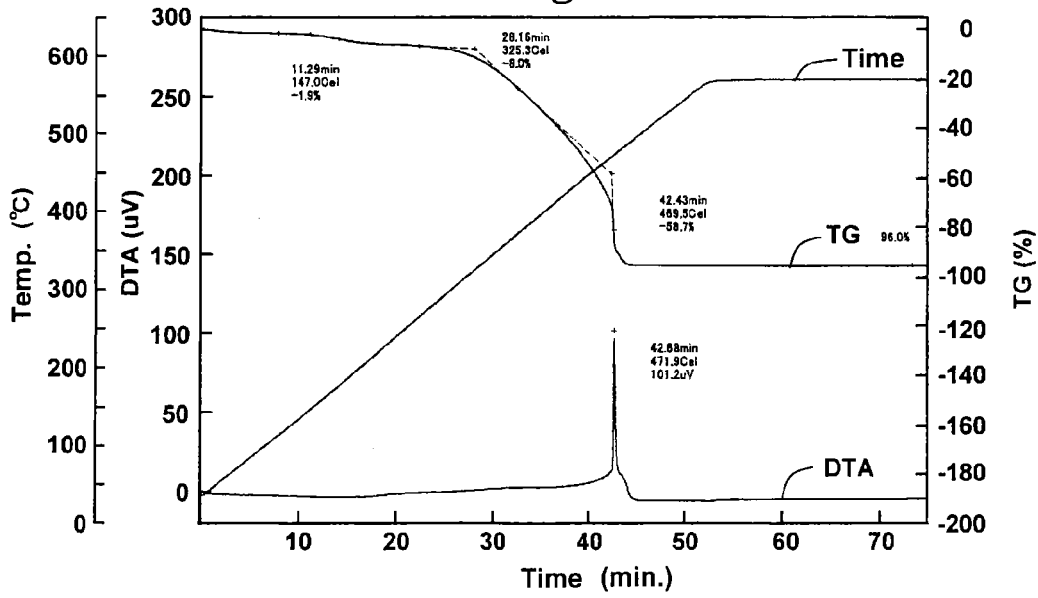
FIG. 12 shows a thermogravimetry-differential thermal analysis chart of the charge control agent of Example 7 of the present invention.

Measurement results of TG-DTA are shown in FIG. 12.

Theoretical and measured values of elemental analysis are shown in Table 6.

TABLE 6

|  | Carbon (%) | Hydrogen (%) | Total chloride (%) |
|---|---|---|---|
| Theoretical value (converted from 20-mers Na) | 59.03 | 3.56 | 25.07 |
| Measured value | 57.34 | 3.50 | 15.85 |

Figure 13:
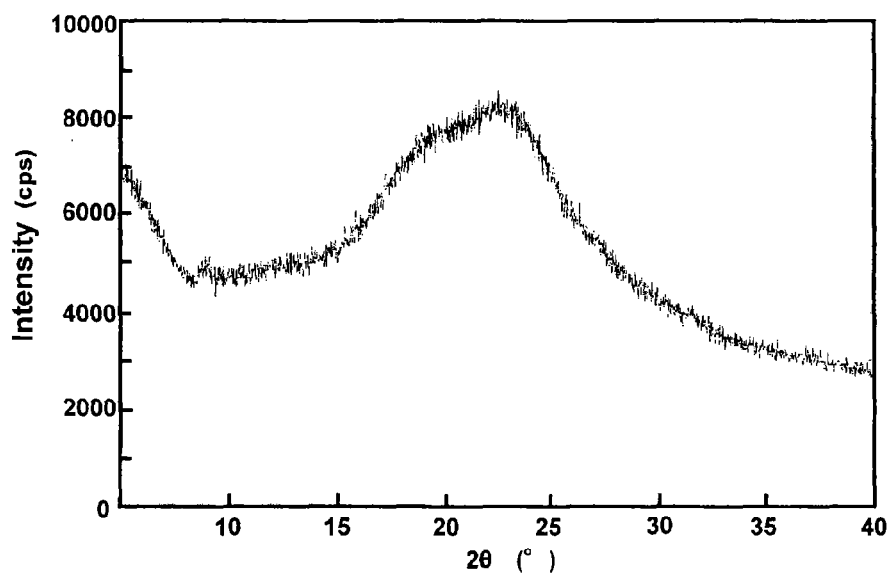
FIG. 13 shows an X-ray diffraction spectrum chart of the charge control agent of Example 7 of the present invention.

The obtained phenol multimeric mixture was subjected to X-ray diffraction analysis. A peak of amorphous state was observed at the Bragg angle 2θ±0.2°. The X-ray diffraction spectrum chart is shown in FIG. 13.

Example 8

Synthesis of 21-22-mers Some Hydrogen Atoms of Phenolic Hydroxyl Group of which are Substituted with Potassium 30.0 g of the 20-21-mers obtained in Example 3 was dissolved by heating in 300 mL of N,N-dimethylformamide with stirring. This solution was added to 3 L of 5% potassium hydrogen carbonate aqueous solution with stirring to precipitate crystals. Then this obtained reaction mixture was filtered with suction and washed with 2 L of water, obtaining a filtered residue. The residue was dried at 80° C. to obtain crystals whose weight was 29.6 g.

In the same manner as shown in Example 7, atomic absorption analysis of the obtained phenol multimeric mixture was carried out. The weight ratio of potassium was 1.28% by weight.

In the same manner as shown in Example 1, elemental analysis and total chlorine analysis of the obtained phenol multimeric mixture were carried out. Theoretical and measured values of elemental analysis are shown in Table 7.

TABLE 7

|  | Carbon (%) | Hydrogen (%) | Total chloride (%) |
|---|---|---|---|
| Theoretical value (converted from 21-mers K) | 58.89 | 3.55 | 25.00 |
| Measured value | 57.27 | 3.52 | 15.79 |

Example 9

Synthesis of 20-21-mers Some Hydrogen Atoms of Phenolic Hydroxyl Group of which are Substituted with Sodium 30.0 g of the 20-21-mers obtained in Example 1 was dissolved by heating in 300 mL of N,N-dimethylformamide with stirring. This solution was added to a 3 L of 5% sodium hydrogen carbonate aqueous solution with stirring to precipitate crystals. Then this obtained reacted mixture was filtered with suction and washed with 2 L of water, obtaining a filtered residue. The residue was dried at 80° C. to obtain crystals whose weight was 33.3 g.

In the same manner as shown in Example 7, atomic absorption analysis of the phenol multimeric mixture was carried out. The weight ratio of sodium was 2.55% by weight.

In the same manner as shown in Example 1, TG-DTA measurement, elemental analysis, total chlorine analysis and X-ray diffraction analysis of the obtained phenol multimeric mixture were carried out.

Figure 14:
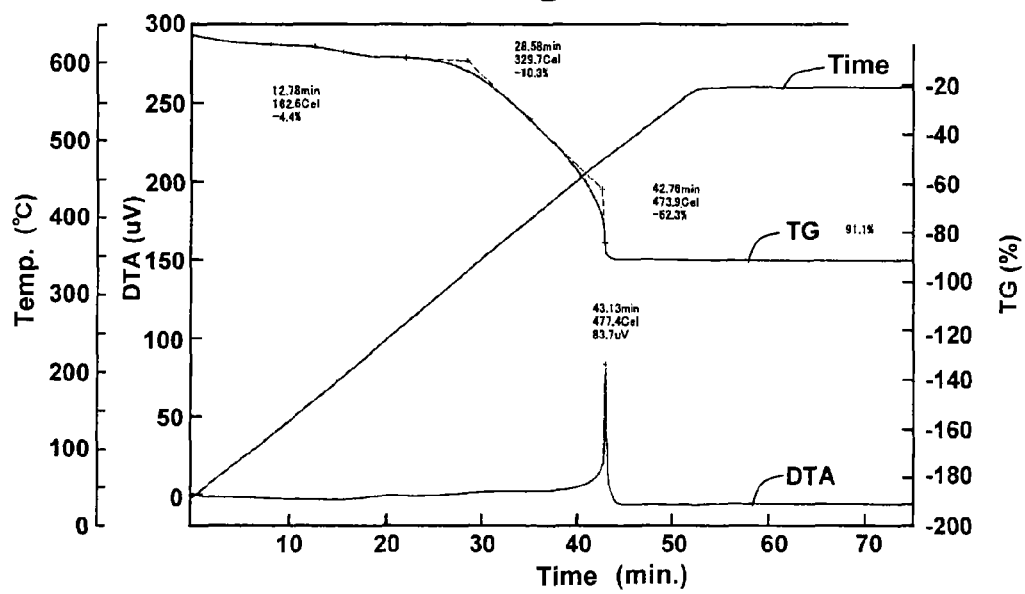
FIG. 14 shows a thermogravimetry-differential thermal analysis chart of the charge control agent of Example 9 of the present invention.

Measurement results of TG-DTA are shown in FIG. 14.

Theoretical and measured values of elemental analysis are shown in Table 8.

TABLE 8

|  | Carbon (%) | Hydrogen (%) | Total chloride (%) |
|---|---|---|---|
| Theoretical value (converted from 20-mers Na) | 58.12 | 3.51 | 24.68 |
| Measured value | 52.45 | 3.58 | 17.75 |

Figure 15:
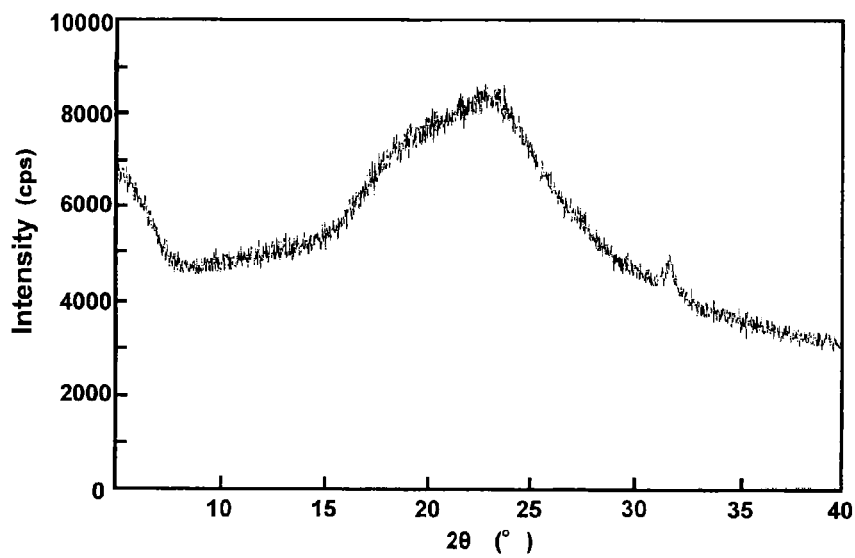
FIG. 15 shows an X-ray diffraction spectrum chart of the charge control agent of Example 9 of the present invention.

The obtained phenol multimeric mixture was subjected to X-ray diffraction analysis. A peak of amorphous state was observed at the Bragg angle 2θ±0.2°. The X-ray diffraction spectrum chart is shown in FIG. 15.

Example 10

Synthesis of 20-21-mers of Chlorophenol

Under a nitrogen atmosphere, 80.7 g (0.300 mol) of bis(5-chloro-2-hydroxyphenyl)methane was dissolved in 99.0 g of acetic acid with stirring. 14.6 g (0.300 mol) of acetaldehyde (90% purity) was added thereto and it was heated up to 80° C. To this solution, a solution, which was mixture of 3.0 g of concentrated sulfuric acid and 9.0 g of acetic acid was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction, washed with 2 L of water, obtaining a filtered residue which was then dried at 80° C. to obtain crystals whose weight was 78.8 g.

In the same manner as shown in Example 1, $^1$H-NMR measurement of the obtained phenol multimeric mixture was carried out. $^1$H-NMR spectrum of the obtained phenol multimeric mixture was measured. Among the signals based on the phenolic hydroxyl group of the phenol multimer, the integral ratio between the signal that appeared on the high magnetic field side and the signal that appeared on the low magnetic field side was 2:18.32, the sum of them being 20.32. The phenol multimer was assumed to be 20-21-mers. In addition, within the range of 4-6 ppm, 4 signals were observed at 4.5 ppm, 4.88 ppm, 5.06 ppm, and 5.29 ppm.

Comparative Example 1

Synthesis of 3-mers of Chlorophenol 30.0 g (0.174 mol) of 4-chloro-2,6-dihydroxy-methyl phenol and 134.2 g (1.04 mol) of 4-chlorophenol were added into 360 mL of 1,2-dichloroethane with stirring, then 3.00 g (17.4 mmol) of p-toluene sulfonic acid was added and reacted at 50° C. for 6 hours with stirring. After that, the obtained reaction mixture containing precipitate was filtered while hot and then washed with 150 mL of 1,2-dichloroethane heated at 50° C. The precipitate was dried at 80° C. to obtain crystals which were dissolved in 400 mL of methanol and filtered to separate insolubles. The filtrate was added into 4 L of water to precipitate crystals. Stirring was continued for a while. The obtained reaction mixture containing the precipitate was filtered with suction, washed with 2 L of water. The obtained filtered residue was dried at 80° C., obtaining 37.9 g (53.3% yield) of purified compound of 3-mers of chlorophenol.

$^1$H-NMR spectrum of the obtained crystals was measured. Among the signals based on the phenolic hydroxyl group of the phenol multimer, the integral ratio between the signal that appeared on the low magnetic field side and the signal that appeared on the high magnetic field side was 2:0.98, the sum of them being 2.98. The chlorophenol multimer was assumed to be 3-mers.

The obtained compound, a trimer of chlorophenol, is represented by the following chemical formula (17) below.

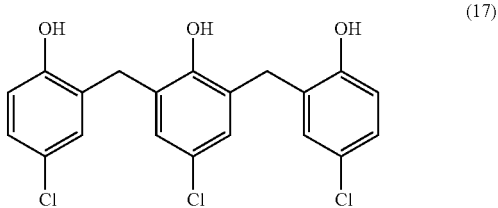 [SMILES: Oc1ccc(Cl)cc1Cc1cc(Cl)cc(Cc2cc(Cl)ccc2O)c1O]

(17)

Comparative Example 2

Synthesis of 14-15-mers of Cresol

Under a nitrogen atmosphere, 32.4 g (0.300 mol) of p-cresol was dissolved in 99.0 g of acetic acid with stirring, and then 8.81 g (0.270 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing a precipitate was added into 3 L of 5% sodium hydrogen carbonate aqueous solution with stirring to further precipitate crystals. The reaction mixture obtained was filtered with suction, washed with 2 L of water, obtaining a filtered residue which was then dried at 80° C. to obtain crystals whose weight was 35.6 g.

$^1$H-NMR spectrum of the obtained crystals was measured. Among the signals based on the phenolic hydroxyl group of the phenol multimer, the integral ratio between the signal that appeared on the low magnetic field side and the signal that appeared on the high magnetic field side was 2:12.27, the sum of them being 14.27. The cresol multimer was assumed to be 14-15-mers.

Comparative Example 3

Synthesis of 8-9-mers of p-phenylphenol

Under a nitrogen atmosphere, 51.1 g (0.300 mol) of p-phenylphenol was dissolved in 99.0 g of acetic acid with stirring. 8.81 g (0.270 mol) of paraformaldehyde (92% purity) was added thereto and it was heated up to 80° C. To this solution, a solution, which was mixed mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction and washed with 2 L of water, obtaining a filtered residue which was then dried at 80° C. to obtain crystals whose weight was 55.8 g.

$^1$H-NMR spectrum of the obtained crystals was measured. Among the signals based on the phenolic hydroxyl group of the phenol multimer, the integral ratio between the signal that appeared on the low magnetic field side and the signal that appeared on the high magnetic field side was 2:6.14, the sum of them being 8.14. The p-phenylphenol multimer was assumed to be 8-9-mers.

Comparative Example 4

Synthesis of 12-13-mers of 4-t-butylphenol

Under a nitrogen atmosphere, 45.1 g (0.300 mol) of 4-t-butylphenol was dissolved in 99.0 g of acetic acid with stirring. 8.81 g (0.270 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction and washed with 2 L of water, obtaining a filtered residue which was then dried at 80° C. to obtain crystals whose weight was 49.4 g.

$^1$H-NMR spectrum of the obtained crystals was measured. Among the signals based on the phenolic hydroxyl group of the phenol multimer, the integral ratio between the signal that appeared on the low magnetic field side and the signal that appeared on the high magnetic field side was 2:10.70, the sum of them being 12.70. The 4-t-butylphenol multimer was assumed to be 12-13-mers.

Comparative Example 5

Synthesis of 40-mers of chlorophenol

Under a nitrogen atmosphere, 38.6 g (0.300 mol) of 4-chlorophenol was dissolved in 99.0 g of acetic acid with stirring. 11.8 g (0.360 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction and washed with 2 L of water, obtaining a filtered residue which was then dried at 80° C. to obtain crystals whose weight was 35.9 g.

$^1$H-NMR spectrum of the obtained crystals was measured. Among the signals based on the phenolic hydroxyl group of the phenol multimer, the integral ratio between the signal that appeared on the low magnetic field side and the signal that appeared on the high magnetic field side was 2:38.10, the sum of them being 40.10. The phenol multimer was assumed to be 40-41-mers.

Comparative Example 6

Synthesis of 12-13-mers of chlorophenol

Under a nitrogen atmosphere, 38.6 g (0.300 mol) of 4-chlorophenol was dissolved in 99.0 g of acetic acid with stirring. 8.81 g (0.270 mol) of paraformaldehyde (92% purity) was added thereto and it was heated up to 80° C. To this solution, a solution, which was mixture of 3.0 g of concentrated sulfuric acid and 9.0 g of acetic acid, was added dropwise. After that, reaction was carried out with stirring at 110° C. for 3 hours, then cooled. The obtained reaction mixture containing precipitate was added into 3 L of 5% sodium hydrogen carbonate aqueous solution with stirring to further precipitate crystals. The reaction mixture obtained was filtered with suction and washed with 2 L of water, obtaining a filtered residue which was then dried at 80° C. to obtain crystals whose weight was 41.6 g.

$^1$H-NMR spectrum of the obtained crystals was measured. Among the signals based on the phenolic hydroxyl group of the phenol multimer, the integral ratio between the signal that appeared on the low magnetic field side and the signal that appeared on the high magnetic field side was 2:10.80, the sum of them being 12.80. The chlorophenol multimer was assumed to be 12-13-mers. A clear signal was not observed within the range of 4-6 ppm.

Preparation of negatively chargeable toner for developing an electrostatic image, which contained the previously-obtained phenol multimeric mixture as a charge control agent, and formation of the image on a recording sheet using this toner, are shown in Examples 11-22 and Comparative Examples 7-12 below.

Example 11

A mixture of:
100 parts by weight of a polyester resin (ER-561, trade name, manufactured by Mitsubishi Rayon Co., Ltd.),
2 parts by weight of low polymerization polypropylene (Viscol 550P, trade name, manufactured by Sanyo Chemical Industries, Ltd.),
6 parts by weight of carbon black (MA-100, trade name, manufactured by Mitsubishi Chemical Corporation), and
1 part by weight of the charge control agent (the phenol multimeric mixture obtained in Example 3)
was uniformly premixed using a high speed mill, obtaining a premix. The premix was melt-kneaded on a heat roll, next cooled down and then coarsely crushed using an ultracentrifugation crusher. Thus obtained coarsely crushed powder was subjected to fine pulverized process using an air jet mill with classifier, obtaining a black toner powder having an average particle size of 10 μm.

Figure 16:
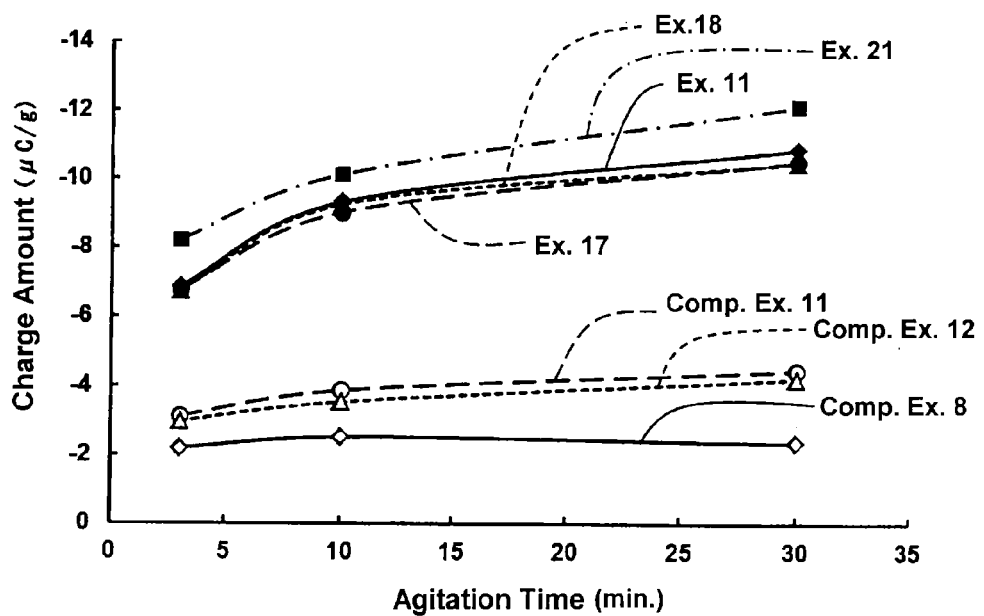
FIG. 16 shows a correlation between the charge amount and the agitation time of some charge control agents obtained from the phenol multimers of the present invention and from compounds of Comparative Examples.

A developer was prepared by mixing 5 parts by weight of the obtained toner and 100 parts by weight of ferrite carrier (F906-80, trade name, produced by Powder Tech Co. Ltd.). The developer, i.e. developing agent, was weighed into a plastic bottle and mixed using a ball mill at a revolution speed of 100 rpm to charge the developer. The amount of charge with the passage of time was measured under a standard condition (at 20° C., and relative humidity of 60%). Table 9 shows the measurement results of the amount of triboelectric charge (minus) over a agitation time (in minutes). FIG. 16 shows a charging curve.

Measurement results for minus charge amount of an initial suction blow (stirring time: 10 minutes) measured under conditions of low temperature and low humidity (5° C., relative humidity 30%) and of high temperature and high humidity (35° C., relative humidity 90%) or measurement results of the environmental stability of charge amount, are shown in Table 10, together with the measurement results measured under the standard conditions (at 20° C., relative humidity 60%). Measurements of charge amount were conducted using a charge amount measuring device for powder (TB-203: trade name, manufactured by KYOCERA Chemical Corporation.) at a blow pressure of 10 kPa and a suction pressure of −10 kPa.

A toner image was formed using a commercially available copier (with organic photoreceptor OPC type drum). "Fogging" and "toner offset" were visually observed to rate them into two or three grades. The results of the evaluation were shown in Table 11.

With respect to the fogging, when no fogging was observed, it was rated as "excellent"; when several fogging were observed, it was rated as "good"; and when fogging was clearly observed, it was rated as "poor". With respect to the toner offset, when no toner offset was observed, it was rated as "good"; if toner offset was observed, it was rated as "poor".

Example 12

A mixture of:
100 parts by weight of polyester resin (ER-561, trade name, manufactured by Mitsubishi Rayon Co., Ltd.),
2 parts by weight of low polymerization polypropylene (Viscol 550P, trade name, manufactured by Sanyo Chemical Industries, Ltd.),
5 parts by weight of quinacridone red pigment (C.I. Pigment Red 122), and
1 part by weight of charge control agent (the phenol multimeric mixture obtained in Example 2)
was processed in the same manner as shown in Example 11, obtaining a magenta toner and a developer. A minus charge amount with the passage of time and environmental stability of charge amount were measured in the same manner as shown in Example 11 and shown in Tables 9 and 10, respectively. Evaluation results of the toner images formed in the same manner as shown in Example 11 by using this developer are shown in Table 11.

Example 13

A mixture of:
100 parts by weight of polyester resin (ER-561, trade name, manufactured by Mitsubishi Rayon Co., Ltd.),
2 parts by weight of low polymerization polypropylene (Viscol 550P, trade name, manufactured by Sanyo Chemical Industries Ltd.),
5 parts by weight of disazo yellow pigment (C.I. Pigment Yellow 180), and
1 part by weight of charge control agent (the phenol multimeric mixture obtained in Example 4)
was processed in the same manner as shown in Example 11, obtaining a yellow toner and a developer. A minus charge amount with the passage of time and environmental stability of charge amount were measured in the same manner as shown in Example 11 and shown in Tables 9 and 10, respectively. Evaluation results of the toner images formed by using the present developer are shown in Table 11.

Example 14

A mixture of:
80 parts by weight of styrene,
20 parts by weight of n-butyl methacrylate, 5 parts by weight of disazo yellow pigment (C.I. Pigment Yellow 180),
1.8 parts by weight of 2,2-azoisobutyronitrile, and
1 part by weight of charge control agent (the phenol multimeric mixture obtained in Example 6),
was uniformly premixed using a high speed mixer, obtaining a polymerisable monomer composition.

On the other hand, 100 mL of 0.1 mol/L sodium tertiary phosphate aqueous solution was diluted by 600 mL of distilled water. Into the obtained solution, 18.7 mL of 1.0 mol/L calcium chloride aqueous solution was gradually added with stirring to prepare a mixture. Further, 0.15 g of aqueous solution containing 20% by weight of sodium dodecylbenzenesulfonate was added to the mixture with stirring, to prepare a dispersion liquid.

This dispersed liquid was added to the polymerizable monomer composition and mixed with high speed stirring using TK homomixer (manufactured by Tokushu Kika Kogyo Co., Ltd.,) with heating up to a temperature of 65° C. After the temperature reached to 65° C., stirring was continued for 30 minutes. Then the temperature was further heated up to 80° C. Polymerization was continued at 80° C. for 6 hours with stirring at a revolution speed of 100 rpm using a common stirrer.

After the polymerization, the reacted mixture was cooled. The solid was filtered. The filtered residue was immersed into an aqueous solution containing 5% by weight of hydrochloric acid to decompose the calcium phosphate which was used as the dispersant. After filtration, the obtained solids were washed with water until the washing liquid became neutralized. Then it was dewatered and dried, obtaining a yellow toner having an average particle size of 13 μm.

5 parts by weight of the obtained polymerized toner was mixed with 100 parts by weight of ferrite carrier (F906-80, trade name, manufactured by Powdertech Co., Ltd.), obtaining a developer. In the same manner as shown in Example 11, a minus charge amount with the passage of time and environmental stability of charge amount were measured and shown in Tables 9 and 10, respectively. Also, evaluation results of the toner images formed in the same manner as shown in Example 11 by using this developer are shown in Table 11.

Example 15

A mixture of:
80 parts by weight of styrene,
20 parts by weight of n-butyl methacrylate,
5 parts by weight of carbon black (MA-100, trade name, manufactured by Mitsubishi Chemical Corporation),
1.8 parts by weight of 2,2'-azoisobutyronitrile, and
1 part by weight of charge control agent (the phenol multimeric mixture obtained in Example 8)
was processed in the same manner as Example 14, obtaining a polymerized black toner and a developer. The measurement results of minus charge amount with the passage of time and environmental stability of a charge amount obtained in the same manner as shown in Example 11 are shown in Tables 9 and 10, respectively. Also, evaluation results of toner images formed in the same manner as shown in Example 11 by using this developer are shown in Table 11.

Example 16

A mixture of:
100 parts by weight of polyester resin (ER-561, trade name, manufactured by Mitsubishi Rayon Co., Ltd.),
2 parts by weight of low polymerization polypropylene (Viscol 550P, trade name, manufactured by Sanyo Chemical Industries, Ltd.), and
5 parts by weight of quinacridone red pigment (C.I. Pigment Red 122)
was uniformly premixed using a high speed mill, obtaining a premix. The premix was melt-kneaded on a heating roll, then cooled down, and coarsely crushed using an ultracentrifugation crusher. The obtained coarsely crushed powder was subjected to fine pulverized process using an air jet mill with classifier, obtaining mother particles of the magenta toner having an average particle size of 10 μm.

A toner can be obtained by externally adding 1 part by weight of child particles comprising the phenol multimeric mixture (charge control agent) obtained in Example 4 to the 108 parts by weight of the obtained mother particles.

100 parts by weight of ferrite carrier (F906-80, trade name, manufactured by Powdertech Co.,) was added to 5 parts by weight of the toner, obtaining a developer. In the same manner as shown in Example 11, a minus charge amount with the passage of time and environmental stability of charge amount were measured and are shown in Tables 9 and 10, respectively. Evaluation of the toner images formed in the same manner as shown in Example 11, are shown in Table 11.

Example 17

A mixture of:
100 parts by weight of styrene-acrylic copolymer resin (Alma Tex CPR-100, product name, manufactured by Mitsui Chemicals, Inc.),
2 parts by weight of low polymerization polypropylene (Viscol 550, product name, manufactured by Sanyo Chemical Industries, Ltd.),
6 parts by weight of carbon black (MA-100, product name, manufactured by Mitsubishi Chemical Corporation), and
1 part by weight of charge control agent (phenol multimeric mixture obtained in Example 1)
was processed in the same manner as shown in Example 11, obtaining a black toner and a developer. In the same manner as shown in Example 11, a minus charge amount with the passage of time and environmental stability of the charge amount were measured and are shown in Tables 9 and 10, respectively. Its charging curve is shown in FIG. 16. Also, evaluation results of toner images formed in the same manner as shown in Example 11 by using this developer are shown in Table 11.

Example 18

In the same manner as shown in Example 11 except that the phenol multimeric mixture produced in Example 5 was used for the charge control agent, a black toner and a developer were prepared. In the same manner as shown in Example 11, an amount of charge (minus) with the passage of time and environmental stability of charge amount were measured and are shown in Tables 9 and 10. Its charging curve is shown in FIG. 16. Also, evaluation results of toner images formed in the same manner as shown in Example 11 by using this developer are shown in Table 11.

Example 19

In the same manner as shown in Example 11 except that the phenol multimeric mixture produced in Example 7 was used for the charge control agent, a black toner and a developer were prepared. In the same manner as Example 11, the amount of charge (minus) with the passage of time and environmental stability of charge amount were measured and shown in Tables 9 and 10, respectively. Also, evaluation results of toner images formed in the same manner as shown in Example 11 by using this developer are shown in Table 11.

Example 20

In the same manner as shown in Example 11 except that the phenol multimeric mixture produced in Example 2 was used for the charge control agent, a black toner and a developer were prepared. In the same manner as shown in Example 11, the amount of charge (minus) with the passage of time and environmental stability of charge amount were measured and shown in Tables 9 and 10. Also, evaluation results of toner images formed in the same manner as shown in Example 11 by using this developer are shown in Table 11.

Example 21

In the same manner as shown in Example 11 except that the phenol multimeric mixture produced in Example 6 was used for the charge control agent, a black toner and a developer were prepared. In the same manner as shown in Example 11, a minus charge amount with the passage of time and environmental stability of charge amount were measured and are shown in Tables 9 and 10. Its charging curve is shown in FIG. 16. Also, evaluation results of toner images formed in the same manner as shown in Example 11 by using this developer are shown in Table 11.

Example 22

In the same manner as shown in Example 11 except that the phenol multimeric mixture produced in Example 10 was used for the charge control agent, a black toner and a developer were prepared. In the same manner as shown in Example 11, a minus charge amount with the passage of time and environmental stability of charge amount were measured and shown in Tables 9 and 10. Also, evaluation results of toner images formed in the same manner as shown in Example 11 by using this developer are shown in Table 11.

Comparative Example 7

In the same manner as shown in Example 11 except that the charge control agent was replaced with the compound produced in Comparative Example 1, a black toner and a developer were prepared. In the same manner as shown in Example 11, a minus charge amount with the passage of time and environmental stability of charge amount were measured and are shown in Tables 9 and 10. Also, evaluation results of toner images formed in the same manner as shown in Example 11 by using this developer are shown in Table 11.

Comparative Example 8

In the same manner as shown in Example 11 except that the charge control agent was replaced with the compound produced in Comparative Example 2, a black toner and a developer were prepared. In the same manner as shown in Example 11, a minus charge amount with the passage of time and environmental stability of charge amount were measured and are shown in Tables 9 and 10. Its charging curve is shown in FIG. 16. Also, evaluation results of toner images formed in the same manner as shown in Example 11 by using this developer are shown in Table 11.

Comparative Example 9

In the same manner as shown in Example 11 except that the charge control agent was replaced with the compound produced in Comparative Example 3, a black toner and a developer were prepared. In the same manner as shown in Example 11, a minus charge amount with the passage of time and environmental stability of charge amount were measured and are shown in Tables 9 and 10. Also, evaluation results of toner images formed in the same manner as shown in Example 11 by using this developer are shown in Table 11.

Comparative Example 10

In the same manner as shown in Example 11 except that the charge control agent was replaced with the compound produced in Comparative Example 4, a black toner and a developer were prepared. In the same manner as shown in Example 11, a minus charge amount with the passage of time and environmental stability of charge amount were measured and are shown in Tables 9 and 10. Also, evaluation results of toner images formed in the same manner as shown in Example 11 by using this developer are shown in Table 11.

Comparative Example 11

In the same manner as shown in Example 11 except that the charge control agent was replaced with the compound produced in Comparative Example 5, a black toner and a developer were prepared. In the same manner as shown in Example 11, a minus charge amount with the passage of time and environmental stability of charge amount were measured and are shown in Tables 9 and 10. Its charging curve is shown in FIG. 16. Also, evaluation results of toner images formed in the same manner as shown in Example 11 by using this developer are shown in Table 11.

Comparative Example 12

In the same manner as shown in Example 11 except that the charge control agent was replaced with the compound produced in Comparative Example 6, a black toner and a developer were prepared. In the same manner as shown in Example 11, a minus charge amount with the passage of time and environmental stability of charge amount were measured and are shown in Tables 9 and 10. Its charging curve is shown in FIG. 16. Also, evaluation results of toner images formed in the same manner as shown in Example 11 by using this developer, are shown in Table 11.

TABLE 9

| | | Agitation Time (min.) | | |
|---|---|---|---|---|
| | | 3 | 10 | 30 |
| Charge Amount ($\mu C/g$) | Ex. 11 | −6.85 | −9.32 | −10.88 |
| | Ex. 12 | −6.98 | −8.67 | −9.83 |
| | Ex. 13 | −6.24 | −7.84 | −9.11 |
| | Ex. 14 | −6.18 | −7.75 | −8.89 |
| | Ex. 15 | −7.23 | −8.85 | −10.29 |
| | Ex. 16 | −6.33 | −8.25 | −9.57 |
| | Ex. 17 | −6.77 | −9.01 | −10.52 |
| | Ex. 18 | −6.74 | −9.24 | −10.49 |
| | Ex. 19 | −7.50 | −9.13 | −11.18 |
| | Ex. 20 | −6.34 | −7.91 | −9.18 |

TABLE 9-continued

| | Agitation Time (min.) | | |
|---|---|---|---|
| | 3 | 10 | 30 |
| Ex. 21 | −8.21 | −10.12 | −12.14 |
| Ex. 22 | −5.68 | −6.90 | −8.17 |
| Comp. ex. 7 | −0.95 | −1.17 | −0.87 |
| Comp. ex. 8 | −2.19 | −2.52 | −2.36 |
| Comp. ex. 9 | −2.37 | −2.66 | −2.90 |
| Comp. ex. 10 | −3.54 | −4.18 | −4.85 |
| Comp. ex. 11 | −3.13 | −3.87 | −4.46 |
| Comp. ex. 12 | −2.98 | −3.54 | −4.22 |

TABLE 10

| | Charge Amount (μC/g) | | |
|---|---|---|---|
| | 5° C. 30% (RH) | 20° C. 60% (RH) | 35° C. 90% (RH) |
| Ex. 11 | −7.20 | −9.32 | −11.44 |
| Ex. 12 | −7.01 | −8.67 | −10.46 |
| Ex. 13 | −6.34 | −7.84 | −9.39 |
| Ex. 14 | −6.24 | −7.75 | −9.29 |
| Ex. 15 | −7.06 | −8.85 | −10.70 |
| Ex. 16 | 6.62 | 8.25 | 9.95 |
| Ex. 17 | −7.16 | −9.01 | −10.82 |
| Ex. 18 | −7.32 | −9.24 | −11.09 |
| Ex. 19 | −7.26 | −9.13 | −10.88 |
| Ex. 20 | −6.19 | −7.91 | −9.64 |
| Ex. 21 | −8.34 | −10.12 | −11.81 |
| Ex. 22 | −5.54 | −6.90 | −8.59 |
| Comp. ex. 7 | −0.53 | −1.17 | −3.64 |
| Comp. ex. 8 | −1.01 | −2.52 | −5.68 |
| Comp. ex. 9 | −0.94 | −2.66 | −5.21 |
| Comp. ex. 10 | −1.98 | −4.18 | −7.53 |
| Comp. ex. 11 | −1.25 | −3.87 | −6.32 |
| Comp. ex. 12 | −1.56 | −3.54 | −5.53 |

TABLE 11

| | Fogging | Offset |
|---|---|---|
| Ex. 11 | Excellent | Good |
| Ex. 12 | Good | Good |
| Ex. 13 | Good | Good |
| Ex. 14 | Good | Good |
| Ex. 15 | Good | Good |
| Ex. 16 | Good | Good |
| Ex. 17 | Excellent | Good |
| Ex. 18 | Good | Good |
| Ex. 19 | Excellent | Good |
| Ex. 20 | Good | Good |
| Ex. 21 | Excellent | Good |
| Ex. 22 | Good | Good |
| Comp. ex. 7 | Poor | Poor |
| Comp. ex. 8 | Poor | Poor |
| Comp. ex. 9 | Poor | Poor |
| Comp. ex. 10 | Poor | Poor |
| Comp. ex. 11 | Poor | Poor |
| Comp. ex. 12 | Poor | Poor |

As is apparent from Tables 9-11, the electrostatic charge image developing toner prepared by using the charge control agent of the present invention was excellent in terms of the charge amount with the passage of time, environmental stability of the charge amount, and fogging and toner offset in the visual evaluation of toner images when compared to the Comparative Examples.

INDUSTRIAL APPLICABILITY

The charge control agents of the present invention have an excellent heat resistance, charging property, environmental stability, etc., so that the charge control agents can be added to improve the charge control properties of toners. Further, since impact on the environment is small because no harmful heavy metals are included, accordingly this charge control agent is useful as safe toners.

The toner of the present invention containing the charge control agent is excellent in charge control property, and can be used widely regardless of colors. In particular, the charge control agent is a colorless or light-color and can be added into a color toner containing colorant that is used to surely exhibit a desired color tone.

Further, the charge controlling method of the present invention is useful not only for duplication using toners but also for various paints such as electrostatic powder paints, etc.

What is claimed is:

1. A charge control agent, comprising:
   a phenol multimeric mixture comprising at least two different phenol multimers each independently represented by the formula (1):

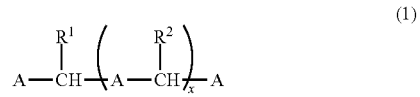

wherein:
$R^1$ and $R^2$ are each independently a hydrogen atom or an alkyl group having a carbon number of from 1 to 3;
A is a monovalent group when placed at end of the main chain or a divalent group when placed within the main chain and is a 4-chlorophenol-ring-containing group represented by the formula (2):

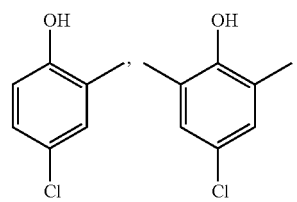

or the formula (3):

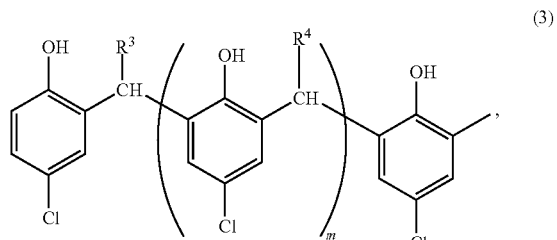

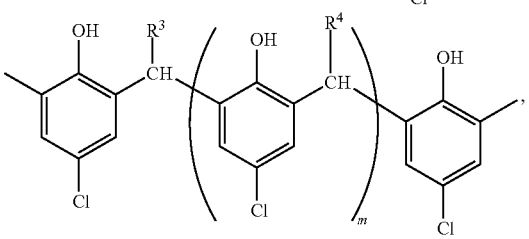

-continued

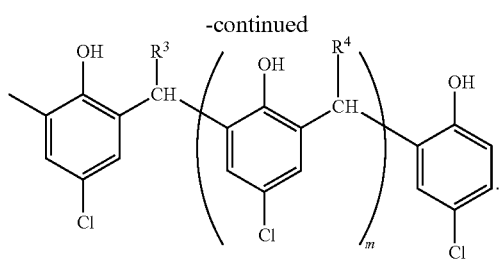

wherein:

$R^3$ and $R^4$ are each independently a hydrogen atom or an alkyl group having a carbon number of from 1 to 3;

m is an integer of from 0 to 2; and x is an integer of from 16 to 28 when A is represented by the formula (2) or is a number within a range represented by (14−2m)/(m+2) to (26−2m)/(m+2) when A is represented by the formula (3).

2. The charge control agent according to claim 1, wherein, among signals based on a phenolic hydroxyl group of a phenol multimer of the at least two phenol multimers in a nuclear magnetic resonance spectrum of the phenol multimeric mixture, an integral ratio between a signal that appears on a low magnetic field side and a signal that appears on a high magnetic field side is in the range of from 2:16 to 2:28.

3. The charge control agent according to claim 1, wherein the phenol multimeric mixture exhibits at least 2 signals between 4 and 6 ppm in a nuclear magnetic resonance spectrum.

4. The charge control agent according to claim 1, wherein the phenol multimeric mixture exhibits a peak of at least 20.4° at a Bragg angle (2θ±0.2°) in an X-ray diffraction spectrum.

5. The charge control agent according to claim 4, wherein the phenol multimeric mixture further exhibits at least one sub peak of 9.9°, 18.2°, and 24.1° at the Bragg angle (2θ±0.2°) on the peak in the X-ray diffraction spectrum.

6. The charge control agent according to claim 1, wherein:

at least some hydrogen atoms of phenolic hydroxyl groups of the at least two different phenol multimers are substituted with alkali metals; and a content of an alkali metal in the at least two different phenol multimers is from 0.1 to 3.0% by weight.

7. The charge control agent according to claim 1, wherein the at least two different phenol multimers are products condensed from a 4-chlorophenol derivative and a formaldehyde derivative.

8. The charge control agent according to claim 7, wherein the formaldehyde derivative is formaldehyde, paraformaldehyde or trioxane.

9. The charge control agent according to claim 7, wherein an equivalent ratio of the formaldehyde derivative to the 4-chlorophenol derivative is from 0.75 to 1.05.

10. The charge control agent according to claim 7, wherein the 4-chlorophenol derivative is at least one of a dimer to a tetramer of 4-chlorophenol which are represented by the formula (4):

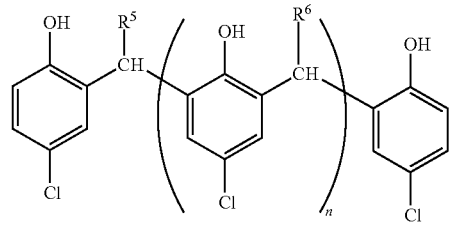

wherein:

$R^5$ and $R^6$ are each independently a hydrogen atom or an alkyl group having a carbon number of from 1 to 3; and n is an integer of from 0 to 2.

11. An electrostatic charge image developing toner, comprising a charge control agent, a resin for toner, and a colorant, wherein the charge control agent comprises: a phenol multimeric mixture comprising at least two different phenol multimers each independently represented by the formula (1):

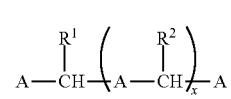

wherein:

$R^1$ and $R^2$ are each independently a hydrogen atom or an alkyl group having a carbon number of from 1 to 3;

A is a monovalent group when placed at end of the main chain or a divalent group when placed within the main chain and is a 4-chlorophenol-ring-containing group represented by the formula (2):

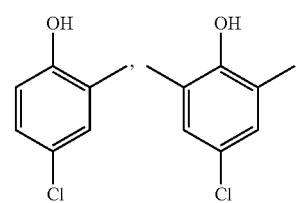

or the formula (3):

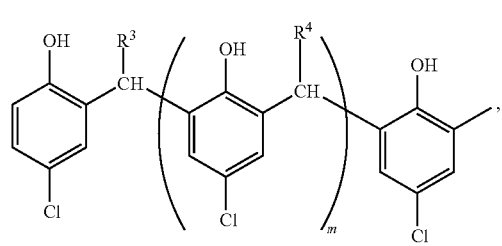

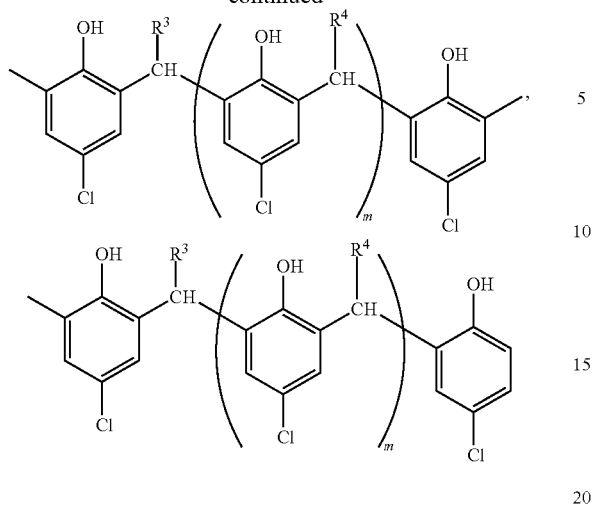

wherein:
$R^3$ and $R^4$ are each independently a hydrogen atom or an alkyl group having a carbon number of from 1 to 3;
m is an integer of from 0 to 2; and
x is an integer of from 16 to 28 when A is represented by the formula (2) or is a number within a range represented by $(14-2m)/(m+2)$ to $(26-2m)/(m+2)$ when A is represented by the formula (3).

12. The electrostatic charge image developing toner according to claim 11, comprising a polymer polymerized with at least the charge control agent, a polymerizable monomer, a polymerization initiator and colorant.